United States Patent
Yamada

(10) Patent No.: US 11,360,661 B2
(45) Date of Patent: Jun. 14, 2022

(54) HANDWRITING INPUT DEVICE AND INFORMATION INPUT METHOD

(71) Applicant: ALPS ALPINE CO., LTD., Tokyo (JP)

(72) Inventor: Tomoki Yamada, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/010,793

(22) Filed: Jun. 18, 2018

(65) Prior Publication Data

US 2018/0300054 A1    Oct. 18, 2018

Related U.S. Application Data

(63) Continuation of application No. PCT/JP2016/087902, filed on Dec. 20, 2016.

(30) Foreign Application Priority Data

Dec. 28, 2015    (JP) .............................. JP2015-257534

(51) Int. Cl.
*G06F 3/04883*    (2022.01)
*G06F 3/01*    (2006.01)
(Continued)

(52) U.S. Cl.
CPC .......... *G06F 3/04883* (2013.01); *G06F 3/017* (2013.01); *G06F 3/0236* (2013.01);
(Continued)

(58) Field of Classification Search
CPC .. G06F 3/04883; G06F 3/0236; G06F 3/0237; G06K 9/00416
See application file for complete search history.

(56) References Cited

U.S. PATENT DOCUMENTS

2009/0128498 A1    5/2009 Hollemans et al.
2011/0050629 A1    3/2011 Homma et al.
(Continued)

FOREIGN PATENT DOCUMENTS

CN    105893338 A  *  8/2016 ......... G06F 3/04886
JP    H05-274477      10/1993
(Continued)

OTHER PUBLICATIONS

International Search Report dated Feb. 28, 2017 in PCT/JP2016/087902 filed on Dec. 20, 2016.

*Primary Examiner* — Scott T Baderman
*Assistant Examiner* — Seung Woon Jung
(74) *Attorney, Agent, or Firm* — IPUSA, PLLC

(57) ABSTRACT

A handwriting input device, in response to a handwriting operation that moves an object on an input surface with the object contacting the input surface, inputs information corresponding to the path of the contact position of the object on the input surface. The handwriting input device includes a sensor part and a determining part. The sensor part detects the contact position of the object on the input surface and the presence or absence of the object within a predetermined operation space adjacent to the input surface. The determining part determines the start and the end of the handwriting operation based on the detection result of the sensor part. The determining part determines the continuance of the handwriting operation in response to detecting the presence of the object within the operation space by the sensor part after determining the start of the handwriting operation.

14 Claims, 16 Drawing Sheets

(51) Int. Cl.
  *G06F 3/023*  (2006.01)
  *G06V 10/22*  (2022.01)
  *G06V 30/32*  (2022.01)
  *G06V 30/10*  (2022.01)

(52) U.S. Cl.
  CPC .......... *G06F 3/0237* (2013.01); *G06V 10/235* (2022.01); *G06V 30/347* (2022.01); *G06F 2203/04101* (2013.01); *G06V 30/10* (2022.01)

(56) References Cited

U.S. PATENT DOCUMENTS

| | | | |
|---|---|---|---|
| 2013/0229341 A1 | 9/2013 | Yui | |
| 2014/0055399 A1* | 2/2014 | Lee | G06F 3/03 345/173 |
| 2014/0363074 A1* | 12/2014 | Dolfing | G06K 9/00979 382/156 |
| 2016/0154580 A1* | 6/2016 | Hirabayashi | G06F 40/171 715/268 |
| 2016/0232146 A1* | 8/2016 | Su | G06F 17/242 |
| 2016/0364027 A1* | 12/2016 | Bernstein | G06F 3/03545 |

FOREIGN PATENT DOCUMENTS

| | | |
|---|---|---|
| JP | 2008-505380 | 2/2008 |
| JP | 2008-134793 | 6/2008 |
| JP | 2011-008379 | 1/2011 |
| JP | 2011-053971 | 3/2011 |
| JP | 2013-182511 | 9/2013 |
| JP | 2014-222391 | 11/2014 |

\* cited by examiner

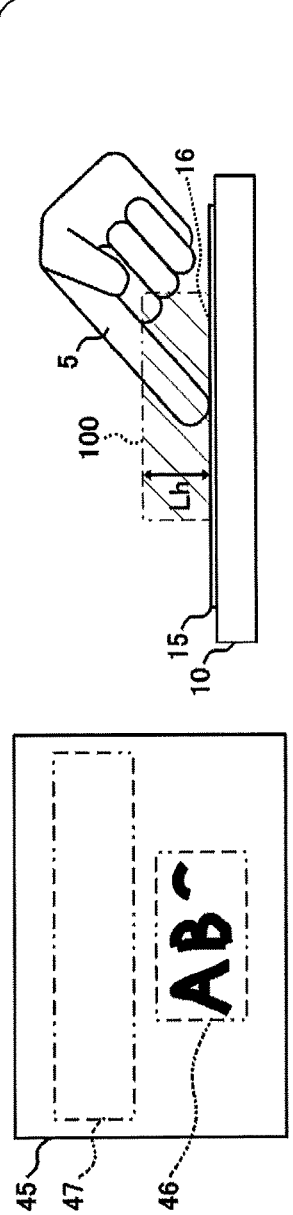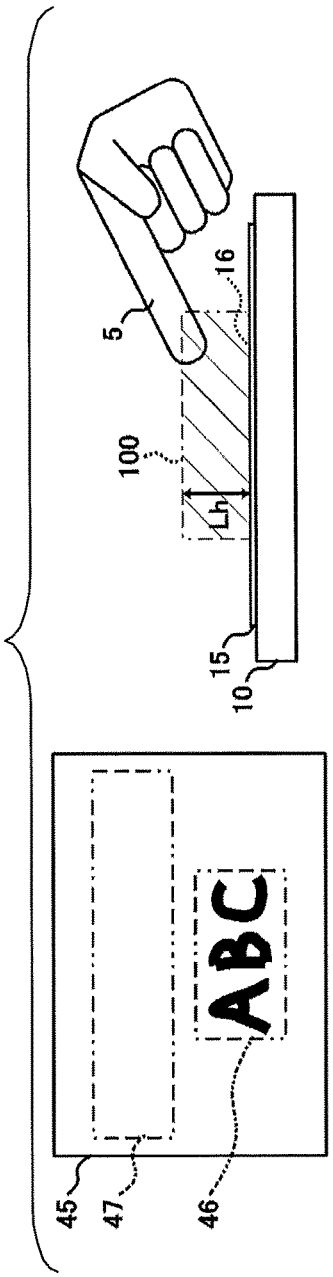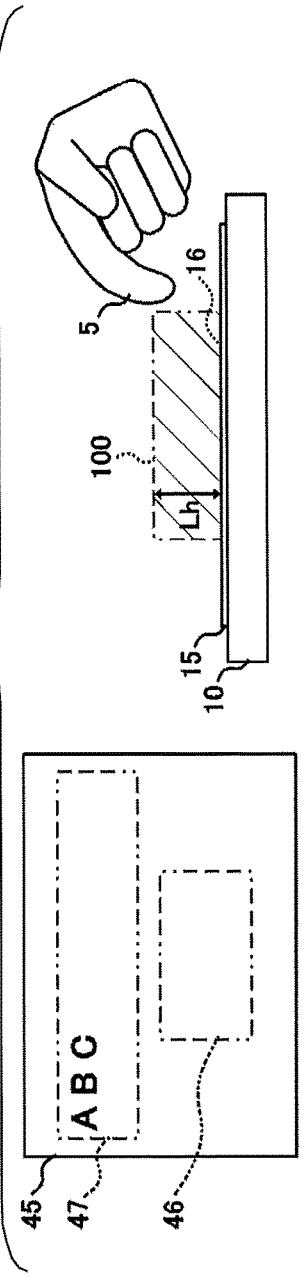

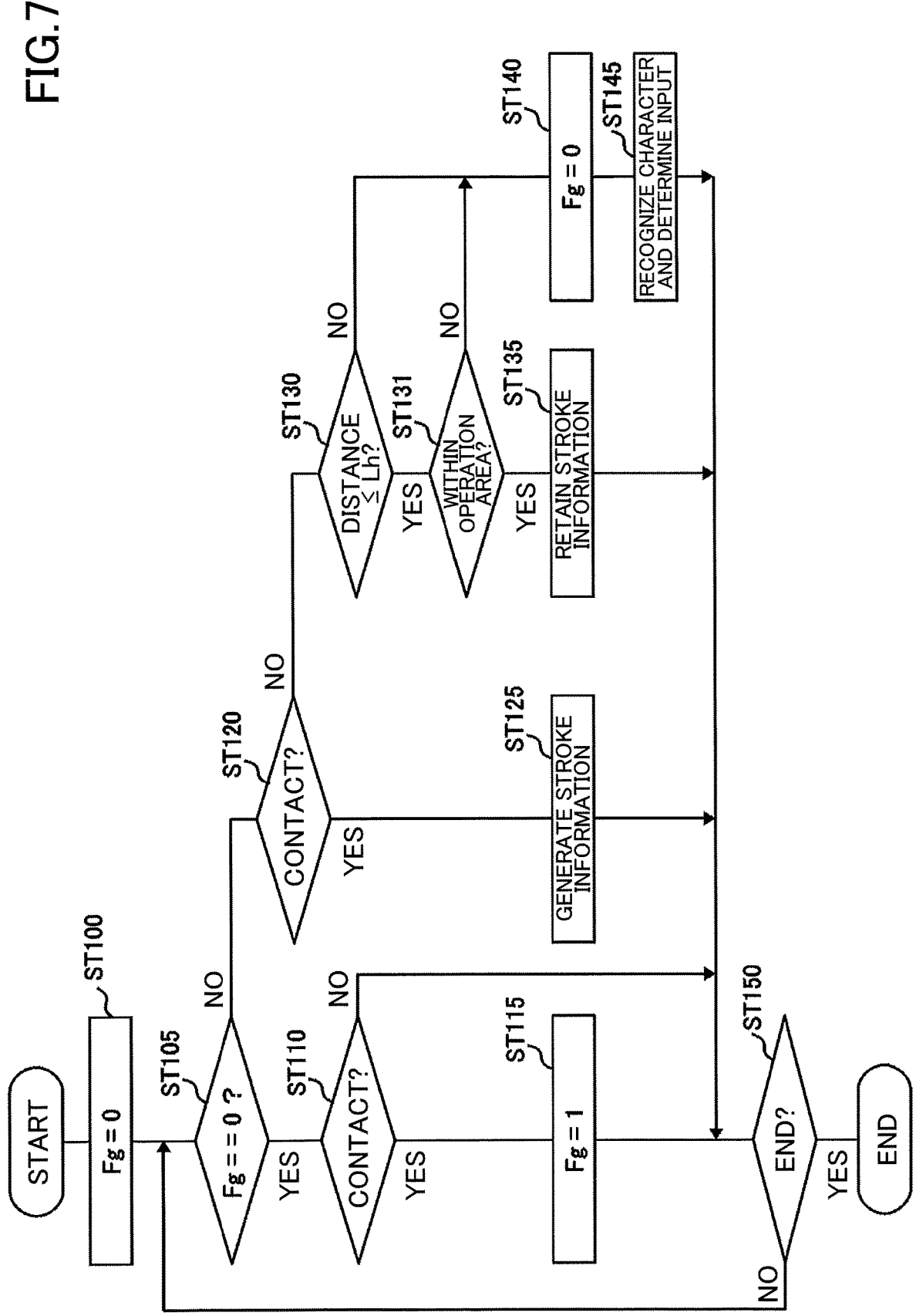

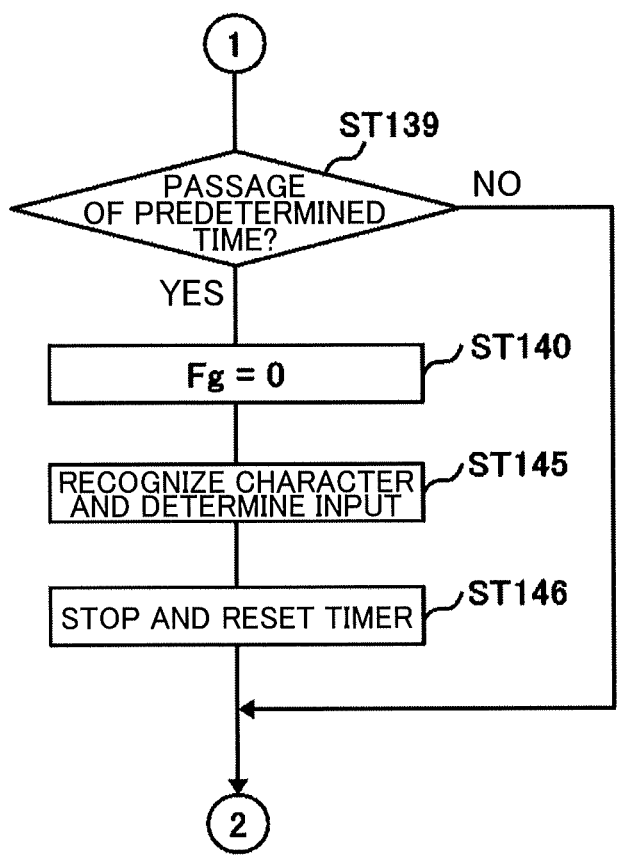

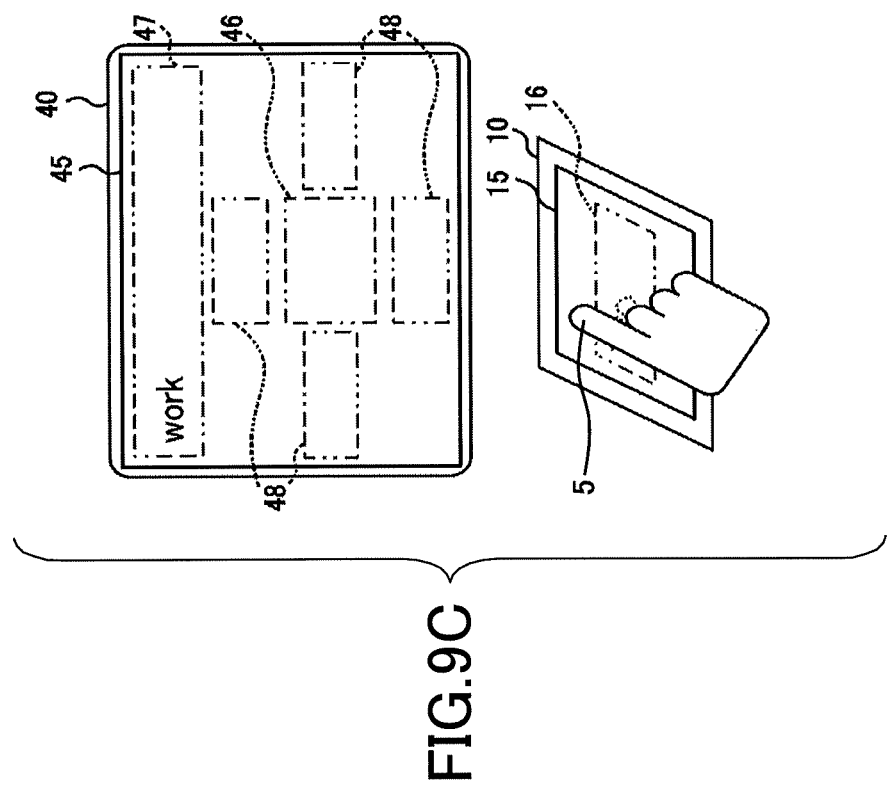

HANDWRITING INPUT DEVICE AND INFORMATION INPUT METHOD

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2016/087902, filed on Dec. 20, 2016 and designating the U.S., which claims priority to Japanese Patent Application No. 2015-257534, filed on Dec. 28, 2015. The entire contents of the foregoing applications are hereby incorporated herein by reference.

BACKGROUND OF THE INVENTION

1. Field of the Invention

The present invention relates to handwriting input devices and information input methods.

2. Description of the Related Art

According to portable devices such as smartphones and tablets, touchscreens are commonly used for input, and many portable devices support character input by handwriting operation. Methods of character input, however, are mainly flick input or keyboard input, and input by handwriting operation is not common at present.

One of the inconveniences of character input by handwriting operation lies in the necessity of determining in some way whether a handwriting operation is continuing. Whether "a stylus is separated from the input surface because of completion of handwriting operation" or "a stylus is temporarily separated from the input surface during handwriting operation" cannot be determined by whether a stylus is in contact with the input surface of a touch sensor alone.

It is generally known to use a timer as a method to determine whether a handwriting operation is continuing. According to this method, the duration of the absence of detection of a stylus's contact during handwriting operation is measured with a timer. If the measured duration is less than or equal to a predetermined time, it is determined that the handwriting operation is continuing, and the handwriting operation is carried on after the stylus makes another contact. If the measured duration exceeds the predetermined time, it is determined that the handwriting operation has ended.

According to the method of recognizing a handwriting input character as described in Japanese Laid-open Patent Publication No. 5-274477 ("Patent Document"), it is possible to temporarily suspend such automatic ending of handwriting operation by a timer. For example, a stylus may remain separated from an input surface during handwriting operation when performing writing while recalling characters. In this case, according to the method of Patent Document, as a result of temporarily suspending the function of automatically ending handwriting operation, the handwriting operation is less likely to end inadvertently, thus making it easier to prevent misrecognition of characters.

SUMMARY OF THE INVENTION

According to an aspect of the present invention, a handwriting input device, in response to a handwriting operation that moves an object on an input surface with the object contacting the input surface, inputs information corresponding to the path of the contact position of the object on the input surface. The handwriting input device includes a sensor part and a determining part. The sensor part detects the contact position of the object on the input surface and the presence or absence of the object within a predetermined operation space adjacent to the input surface. The determining part determines the start and the end of the handwriting operation based on the detection result of the sensor part. The determining part determines the continuance of the handwriting operation in response to detecting the presence of the object within the operation space by the sensor part after determining the start of the handwriting operation.

BRIEF DESCRIPTION OF THE DRAWINGS

FIG. 2A illustrates a handwriting operation in progress and FIG. 2B illustrates the end of the handwriting operation;

FIG. 3A illustrates a state where a finger is in contact with the input surface, FIG. 3B illustrates a state where the finger is separated from the input surface within an operation space, and FIG. 3C illustrates a state where the finger is outside the operation space;

FIG. 5A illustrates a handwriting operation in progress and FIG. 5B illustrates the end of the handwriting operation;

FIGS. 6A through 6C are diagrams illustrating a continuous handwriting operation and an example of display of the display part according to the handwriting input device of the second embodiment, including views in a direction parallel to the input surface on the right side, where FIG. 6A illustrates a state where the finger is in contact with the input surface, FIG. 6B illustrates a state where the finger is separated from the input surface within the operation space, and FIG. 6C illustrates a state where the finger is outside the operation space;

FIG. 7 is a flowchart for illustrating an operation of the handwriting input device according to the second embodiment;

FIGS. 8A and 8B are flowcharts for illustrating an operation of a handwriting input device according to a third embodiment;

FIGS. 9A through 9C are diagrams illustrating a continuous handwriting operation and an example of display of the display part according to a handwriting input device of a fourth embodiment, including perspective views of the input surface on the lower side, where FIG. 9A illustrates a state where the finger is in contact with the input surface, FIG. 9B illustrates a state where the finger travels leftward to move outside from within the operation space, and FIG. 9C illustrates a state where an input character is determined with the finger outside the operation space;

FIG. 11A illustrates a state where the finger is in contact with the input surface, FIG. 11B illustrates a state where the finger is separated from the input surface and is within the operation space, FIG. 11C illustrates a state where the finger is separated from the input surface and travels rightward within the operation space, FIG. 11D illustrates a state where the finger is separated from the input surface and travels further rightward within the operation space, FIG. 11E illustrates a state where the finger moves outside from within the operation space, and FIG. 11F illustrates a state where an input character is determined with the finger outside the operation space.

DETAILED DESCRIPTION OF THE PREFERRED EMBODIMENTS

According to the above-described method of Patent Document, to temporarily suspend the function of automatically ending handwriting operation, an operation different from the handwriting operation (such as a button operation) has to be frequently performed. That is, there is the problem of degraded operability due to the necessity of performing a troublesome operation other than the handwriting operation.

According to an aspect of the present invention, a handwriting input device and an information input method that can accurately determine that a handwriting operation is continuing (in progress) without performance of a troublesome operation are provided.

One or more embodiments are described below with reference to the accompanying drawings.

First Embodiment

Figure 1:
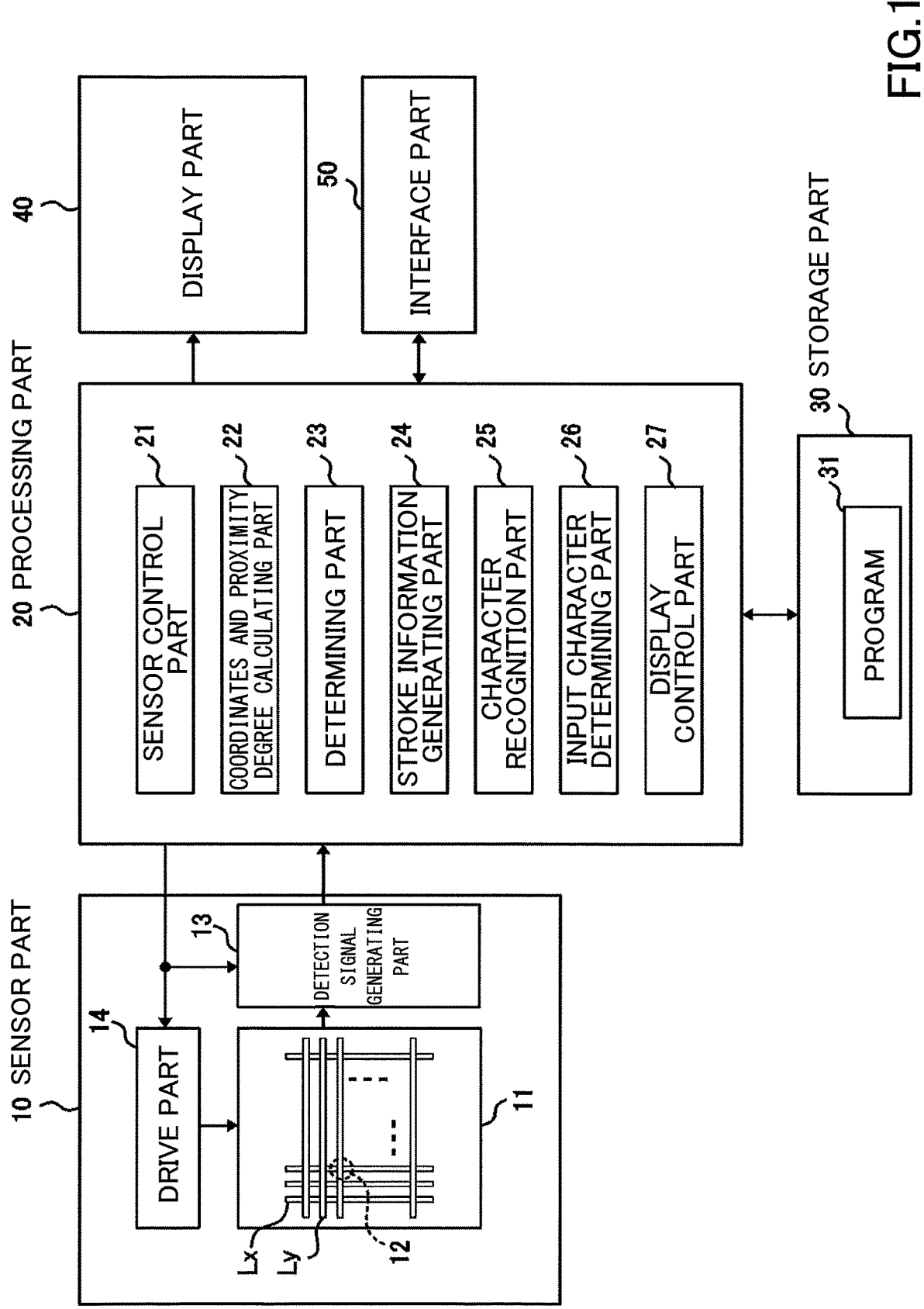
FIG. 1 is a diagram illustrating a configuration of a handwriting input device according to a first embodiment.

FIG. 1 is a diagram illustrating a configuration of a handwriting input device according to a first embodiment of the present invention. In the illustration of FIG. 1, the handwriting input device of this embodiment includes a sensor part 10, a processing part 20, a storage part 30, a display part 40, and an interface part 50. When a handwriting operation that moves an object such as a finger or stylus on an input surface 15 (FIGS. 2A and 2B) of the sensor part 10 with the object contacting the input surface 15 is performed, the handwriting input device of this embodiment inputs information (such as a character, symbol or figure) corresponding to or expressed by the path of the position of contact (contact position) of the object on the input surface 15. In the following, by way of example, a description is given of the case where an object that contacts the input surface 15 in handwriting operations is a finger, while other objects such as a stylus may also be used in handwriting operations.

The sensor part 10 is configured to detect the contact position of a finger on the input surface 15 and the presence or absence of a finger in a predetermined operation space 100 (FIGS. 3A through 3C) adjacent to the input surface 15. In the illustration of FIG. 1, the sensor part 10 includes a sensor matrix 11, a detection signal generating part 13, and a drive part 14.

The sensor matrix 11 includes multiple sensor elements 12 provided at multiple locations at the input surface 15. Each sensor element 12 detects a change in capacitance commensurate with the distance to a finger. In the illustration of FIG. 1, the sensor matrix 11 includes multiple vertically extending drive electrodes Lx and multiple horizontally extending detection electrodes Ly. The drive electrodes Lx are horizontally arranged side by side to be parallel to one another. The detection electrodes Ly are vertically arranged side by side to be parallel to one another. The drive electrodes Lx and the detection electrodes Ly cross each other like a lattice, and are electrically insulated from each other. The sensor elements 12 are formed one near each crossing of the drive electrodes Lx and the detection electrodes Ly. The electrodes Lx and Ly, which are depicted as having an elongated rectangular shape in the illustration of FIG. 1, may have another shape as desired (such as a diamond pattern). Hereinafter, the sensor elements 12 may be typically or collectively referred to as "sensor element 12" where appropriate.

The drive part 14 applies a drive voltage to each sensor element 12 of the sensor matrix 11. For example, the drive part 14 selects the drive electrodes Lx one by one in order to periodically change the electric potential of the selected drive electrode Lx, in accordance with the control of the processing part 20. The change in the electric potential of the drive electrode Lx changes a drive voltage applied to the sensor elements 12 formed near the crossings of this drive electrode Lx and the detection electrodes Ly, thereby causing charging or discharge in the sensor elements 12.

The detection signal generating part 13 generates a detection signal corresponding to a charge transmitted at each detection electrode Ly when the sensor element 12 is charged or discharged with application of a drive voltage by the drive part 14. That is, the detection signal generating part 13 samples a charge transmitted at each detection electrode Ly in synchronization with a periodic change in the drive voltage of the drive part 14, and generates a detection signal according to the result of the sampling.

For example, the detection signal generating part 13 includes a capacitance-to-voltage converter circuit (CV converter circuit) that outputs a voltage commensurate with the capacitance of the sensor element 12 and an analog-to-digital converter circuit (AD converter circuit) that converts the output signal of the CV converter circuit into a digital signal and outputs the digital signal as a detection signal.

The detection signal generating part 13 generates a detection signal corresponding to the capacitance between a finger and the sensor element 12, whose signal level changes in accordance with the finger's distance from the input surface 15. According to this embodiment, the detection signal generating part 13 generates a relatively high-sensitive detection signal, which has such a signal level as to enable determination of the distance between the input surface 15 and a finger separated from the input surface 15. Furthermore, even when the finger is separated from the input surface 15, it is possible to determine the coordinates of the finger's proximate position on the input surface 15 from detection signals obtained at multiple sensor elements 12.

The sensor part 10 shown in the illustration of FIG. 1 detects the proximity of a finger by a change in capacitance (mutual capacitance) between the electrodes Lx and Ly. The sensor part 10, however, is not limited to this illustration, and may detect the proximity of a finger by various other methods. For example, the sensor part 10 may detect capacitance (self-capacitance) generated between an electrode and ground by a finger's approach. In the case of detecting self-capacitance, a drive voltage is applied to a detection electrode. Furthermore, the sensor part 10 is not limited to a capacitive type, and may be, for example, a resistive type or an inductive type.

The sensor part 10 shown in the illustration of FIG. 1 uses the sensor element 12 common to detection of the contact position of a finger on the input surface 15 and detection of the presence or absence of a finger in the operation space 100. These detections, however, may alternatively be performed independently by different sensors. For example, an optical sensor such as an infrared sensor may be used to detect the presence or absence of a finger in the operation space 100.

The processing part 20, which is a circuit that controls the overall operation of the handwriting input device, includes, for example, a computer or computer processor that performs processing in accordance with the instruction codes of a program 31 stored in the storage part 30 as described below and a logic circuit that implements a specific function. The processing of the processing part 20 may be entirely implemented by a computer and a program, or may be partly or entirely implemented by a dedicated logic circuit.

In the illustration of FIG. 1, the processing part 20 includes a sensor control part 21, a coordinates and proximity degree calculating part 22, a determining part 23, a stroke information generating part 24, a character recognition part 25, an input character determining part 26, and a display control part 27.

The sensor control part 21 controls the sensor part 10 to perform a periodic detecting operation to detect a change in capacitance due to the proximity of a finger cycle by cycle in the sensor elements 12 distributed at the input surface 15. Specifically, the sensor control part 21 controls the circuits of the drive part 14 and the detection signal generating part 13 so that selection of a drive electrode and generation of a pulse voltage in the drive part 14 and selection of a detection electrode and generation of a detection signal in the detection signal generating part 13 are periodically performed with proper timing.

The coordinates and proximity degree calculating part 22 calculates coordinates representing the position of a finger on the input surface 15 and calculates a degree of proximity commensurate with the degree of proximity of (the distance between) the coordinates on the input surface 15 and the finger, based on the detection signals of the sensor elements 12 periodically obtained by the control of the sensor control part 21.

The determining part 23 determines the start and end of a continuous handwriting operation based on the detection result of the sensor part 10. For example, the determining part 23 compares the degree of proximity of a finger calculated based on the detection signals of the sensor part 10 in the coordinates and proximity degree calculating part 22 with a predetermined threshold for contact determination, and determines whether the finger is in contact with the input surface 15 based on the result of the comparison. In response to determining that there is the finger's contact with the input surface 15 in a situation where no start of a handwriting operation has yet been determined since the end of the last handwriting operation (or the activation of the system), the determining part 23 determines that a handwriting operation has been newly started.

When the presence of the finger in the operation space 100 is detected in the sensor part 10 after the determination of the start of a handwriting operation, the determining part 23 determines the continuance of this handwriting operation. When the absence of the finger in the operation space 100 is detected in the sensor part 10 after the determination of the start of a handwriting operation, the determining part 23 determines the end of the handwriting operation.

Figures 3A, 3B, 3C:
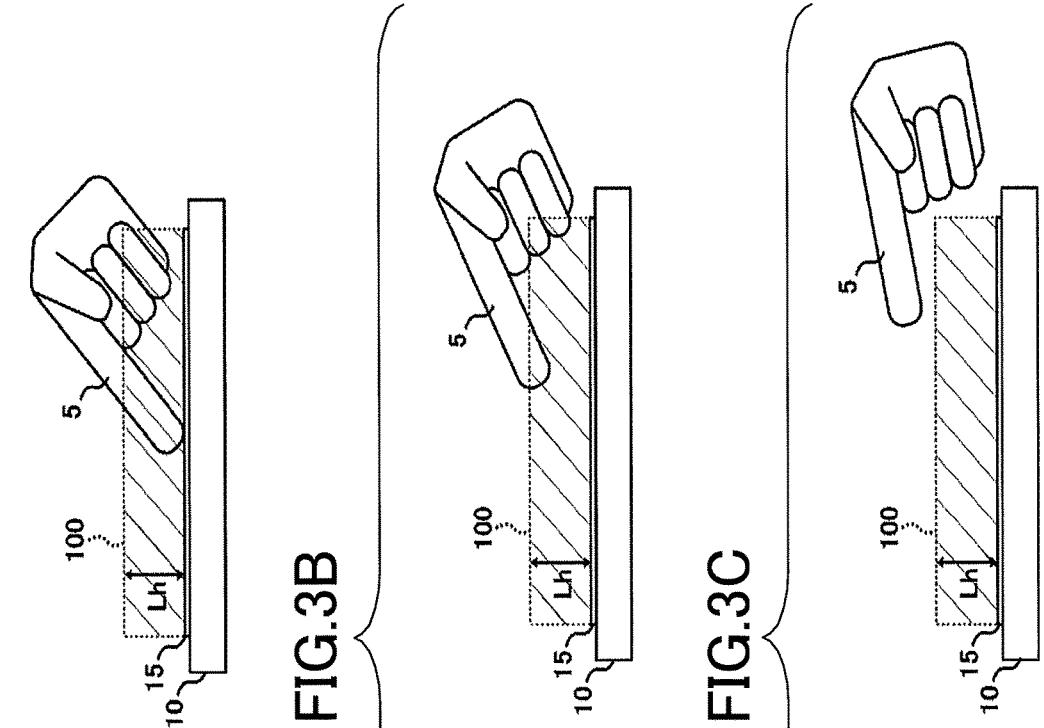
FIGS. 3A through 3C are diagrams illustrating a continuous handwriting operation and an example of display of the display part according to the handwriting input device of the first embodiment, including views in a direction parallel to the input surface on the right side, where

For example, the determining part 23 compares the degree of proximity of a finger calculated based on the detection signals of the sensor part 10 in the coordinates and proximity degree calculating part 22 with a predetermined threshold for distance determination, and determines whether the finger is within a predetermined distance Lh (for example, within 3 cm; FIGS. 3A through 3C) from the input surface 15 based on the result of the comparison. In this case, a space within the predetermined distance Lh from the input surface 15 corresponds to the operation space 100. When the finger is within the predetermined distance Lh, the determining part 23 determines the continuance of the handwriting operation. When the distance between the finger and the input surface 15 exceeds the predetermined distance Lh, the determining part 23 determines the end of the handwriting operation.

The stroke information generating part 24 generates stroke information corresponding to the path of the contact position of a finger detected in the sensor part 10 during a handwriting operation whose start has been determined by the determining part 23. For example, the stroke information generating part 24 generates stroke information using the coordinates of a finger at the time when the determining part 23 determines that the finger is in contact with the input surface 15 among the series of coordinates of the finger periodically calculated based on the detection signals of the sensor part 10 in the coordinates and proximity degree calculating part 22.

The character recognition part 25 recognizes a character expressed by the path of the contact position of a finger on the input surface 15 based on the stroke information generated in the stroke information generating part 24. For example, in addition to recognizing individual characters based on the stroke information, the character recognition part 25 recognizes a set of characters (a word) presumed from an array of characters. Characters here may include various symbols and figures that can be used to communicate information as language.

The input character determining part 26, when the end of a handwriting operation is determined in the determining part 23, determines a character input by this handwriting operation based on the recognition result of the character recognition part 25 based on the stroke information generated in the stroke information generating part 24 during this handwriting operation. For example, when multiple possible input characters (including sets of characters) are recognized in the character recognition part 25, the input character determining part 26 determines the highest-ranked character in the estimation by the character recognition part 25 as a character input by the handwriting operation.

The display control part 27 performs control related to image display in the display part 40. When the determining part 23 determines the continuance of a handwriting operation, the display control part 27 displays the path of the contact position of a finger corresponding to stroke information in a handwriting operation display area 46 (FIGS. 2A and 2B) of the display part 40. When the determining part 23 determines the end of a handwriting operation, the display control part 27 erases the path of the contact position of a finger displayed in the handwriting operation display area 46 of the display part 40, and displays a character determined by the input character determining part 26 in an input result display area 47 (FIGS. 2A and 2B) of the display part 40.

The storage part 30 stores constant data and variable data used in processing in the processing part 20. When the processing part 20 includes a computer, the storage part 30 may store the program 31 executed by the computer. The storage part 30 includes, for example, a volatile memory such as a dynamic random-access memory (DRAM) or a static random-access memory (SRAM), a non-volatile memory such as a flash memory, and a hard disk drive (HDD).

The display part 40 is a device that displays an image corresponding to an image signal that the processing part 20 outputs. The display part 40 includes, for example, a liquid crystal display or an organic electro-luminescence (EL) display. The display part 40 may be integrated with the sensor part 10 into a touchscreen.

The interface part 50 is a circuit for exchanging data between the handwriting input device and other devices (such as the control integrated circuit [IC] of an information apparatus in which the handwriting input device is installed). The processing part 20 outputs information stored in the storage part 30 to a control device (not depicted) through the interface part 50. Furthermore, the interface part 50 may acquire the program 31 recorded on a non-transitory tangible medium (such as a digital versatile disk [DVD]) from a reader (such as a disk drive unit) (not depicted) and write the obtained program 31 to the storage part 30. Alternatively, the interface part 50 may download the program 31 from a server (not depicted) and write the downloaded program 31 to the storage part 30.

Here, operations of the handwriting input device having the above-described configuration is described.

Figure 2B:
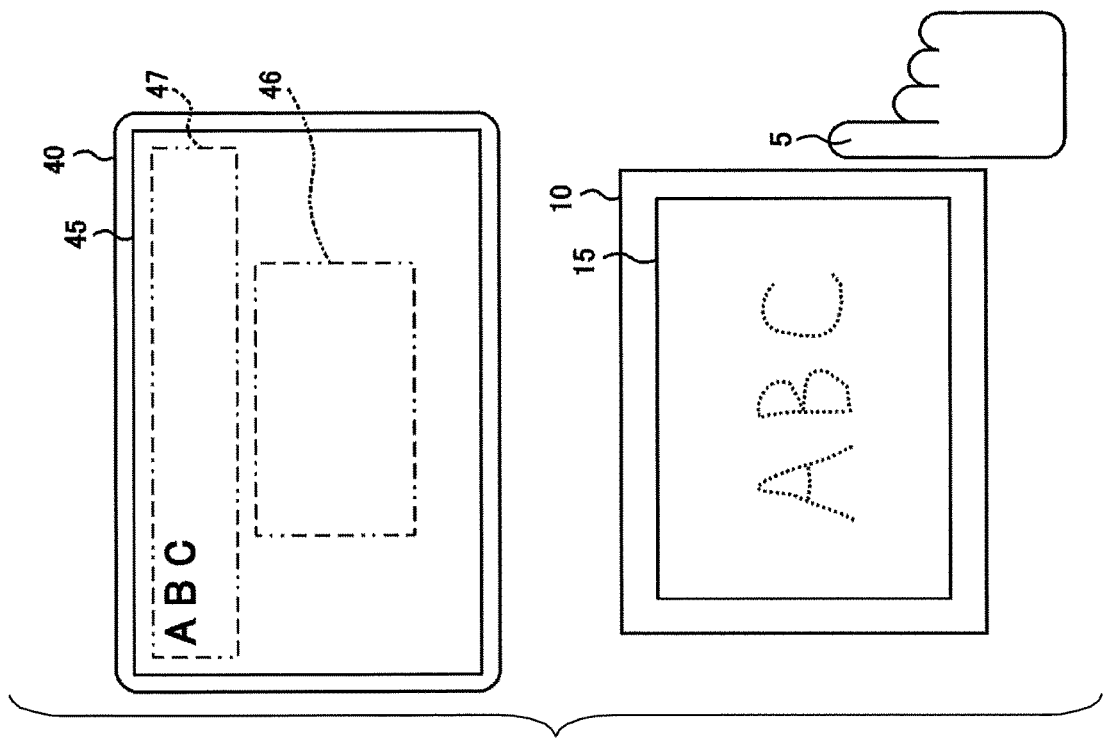
FIGS. 2A and 2B are views in a direction perpendicular to an input surface, illustrating a continuous handwriting operation and an example of display of a display part according to the handwriting input device of the first embodiment, where
Figure 2A:
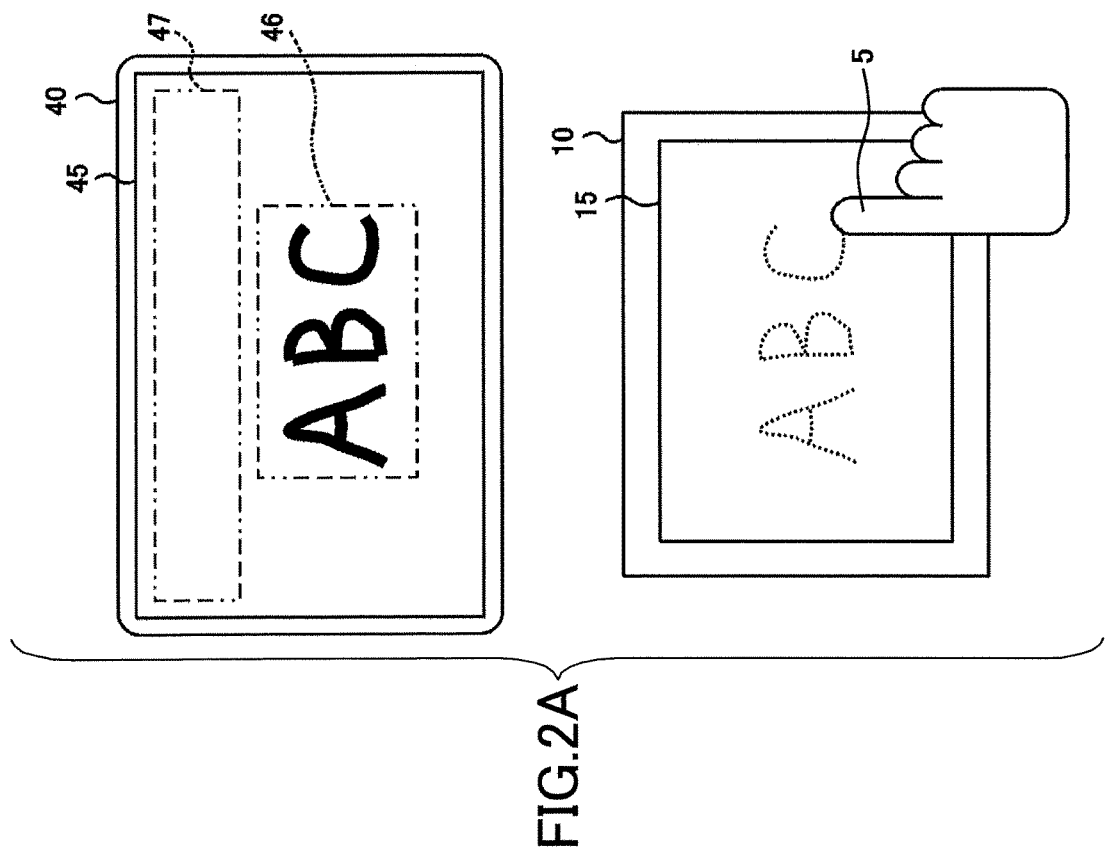

FIGS. 2A and 2B and FIGS. 3A through 3C are diagrams illustrating a continuous handwriting operation and an example of display of the display part 40 according to the handwriting input device of the first embodiment. FIGS. 2A and 2B illustrate views in a direction perpendicular to the input surface 15. FIGS. 3A through 3C illustrate, on the right side, views in a direction parallel to the input surface 15.

When a handwriting operation is performed, moving a finger 5 on the input surface 15 with the finger 5 contacting the input surface 15, lines corresponding to the path of the contact position of the finger 5 on the input surface 15 (dotted lines on the input surface 15) are displayed in the handwriting operation display area 46 of the display part 40 as illustrated in FIGS. 2A and 3A. As illustrated in FIG. 3B, even when the finger 5 is separated from the input surface 15, the determining part 23 determines that the handwriting operation is continuing if the distance between the finger 5 and the input surface 15 is within the predetermined distance Lh. In this case, the path of the contact position of the finger 5 continues to be displayed in the handwriting operation display area 46.

When the distance between the finger 5 and the input surface 15 exceeds the predetermined distance Lh, the determining part 23 determines the termination of the handwriting operation. In this case, as illustrated in FIGS. 2B and 3C, the path of the contact position of the finger 5 in the handwriting operation display area 46 is erased, and characters "ABC" determined by the input character determining part 26 are displayed in the input result display area 47.

Figure 4:
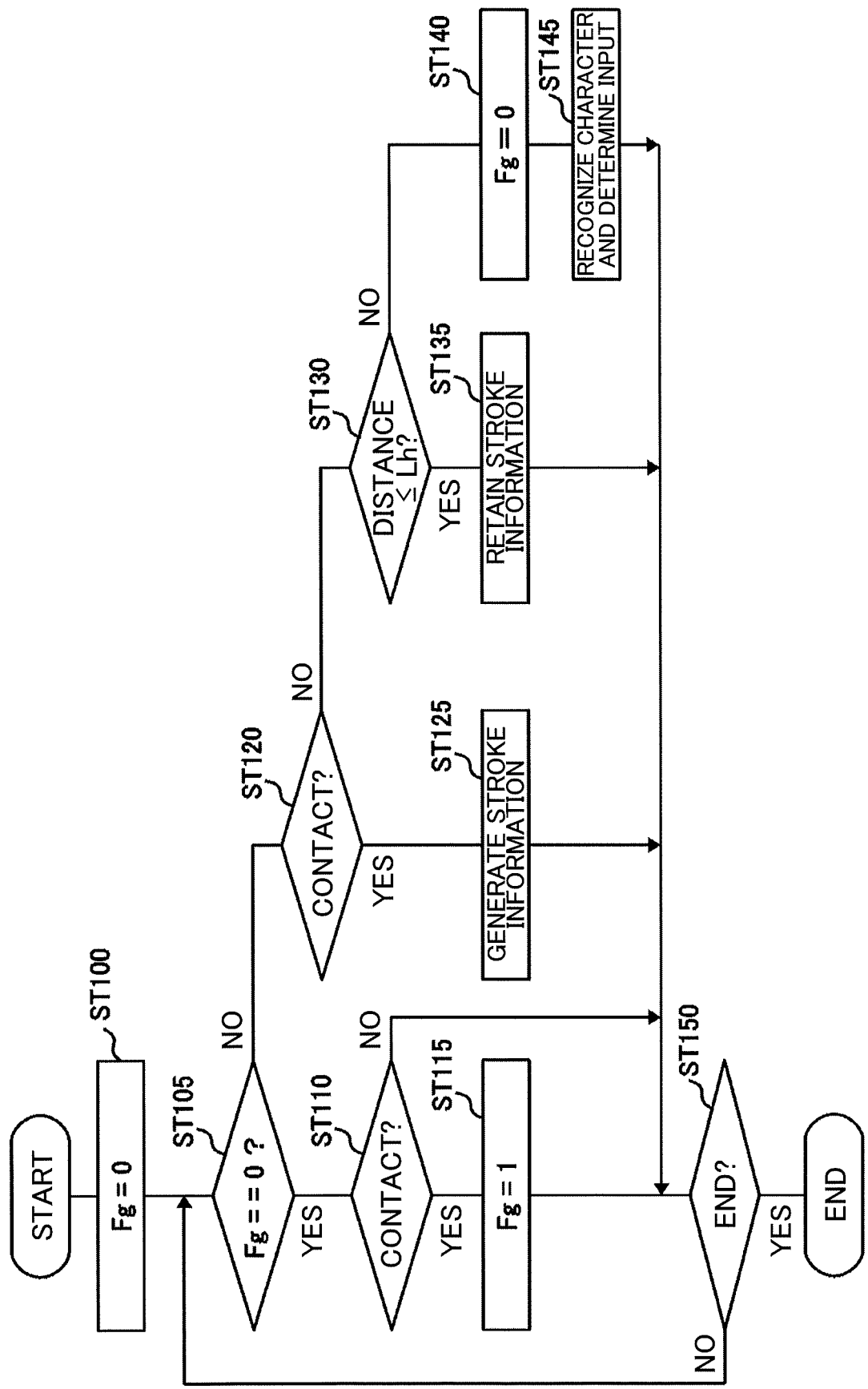
FIG. 4 is a flowchart for illustrating an operation of the handwriting input device according to the first embodiment.

FIG. 4 is a flowchart for illustrating an operation of the handwriting input device according to the first embodiment.

At step ST100, in the initial state, the determining part 23 sets "0" to a flag Fg indicating the state of handwriting operation. The flag Fg of "0" indicates AWAITING OPERATION and the flag Fg of "1" indicates OPERATION IN PROGRESS. After step ST100, the process proceeds to step ST105.

At step ST105, the determining part 23 determines the state of handwriting operation based on the flag Fg. In the case of the state of AWAITING OPERATION (the flag Fg of "0"), the process proceeds to step ST110. In the case of the state of OPERATION IN PROGRESS (the flag Fg of "1"), the process proceeds to step ST120.

In the case of the state of AWAITING OPERATION (YES at step ST105), at step ST110, the determining part 23 determines whether any finger is in contact with the input surface 15 based on a detection signal that the sensor part 10 outputs. That is, when the coordinates and proximity degree calculating part 22 calculates the coordinates of a finger based on a detection signal output by the sensor part 10, the determining part 23 compares a degree of proximity calculated with respect to the finger with a threshold for contact determination, and determines whether the finger is in contact with the input surface 15 based on the result of the comparison. In response to determining that the finger is in contact with the input surface 15 (YES at step ST110), the determining part 23 sets "1" to the flag Fg. In response to determining that the finger is out of contact with the input surface 15 (NO at step ST110), the determining part 23 maintains the value of the flag Fg.

In the case of the state of OPERATION IN PROGRESS (NO at step ST105), at step ST120, the determining part 23 determines whether a finger is in contact with the input surface 15 based on a detection signal that the sensor part 10 outputs. That is, when the coordinates and proximity degree calculating part 22 calculates the coordinates of a finger based on a detection signal output by the sensor part 10, the determining part 23 compares a degree of proximity calculated with respect to the finger with a threshold for contact determination, and determines whether the finger is in contact with the input surface 15 based on the result of the comparison.

In response to the determining part 23 determining that the finger is in contact with the input surface 15 (YES at step ST120), at step ST125, the stroke information generating part 24 acquires the coordinates calculated by the coordinates and proximity degree calculating part 22 as the coordinates of the contact position of the finger, and stores the acquired coordinates. Furthermore, the stroke information generating part 24 generates stroke information expressing the path of the contact position of the finger based on the coordinates of the contact position of the finger that have been acquired since the beginning of the period of the current handwriting operation. The display control part 27 displays the path of the contact position of the finger corresponding to the generated stroke information in the handwriting operation display area 46 of the display part 40 (FIGS. 2A and 3A).

In response to the determining part 23 determining that the finger is out of contact with the input surface 15 (NO at step ST120), the process proceeds to step ST130.

In response to determining the state of OPERATION IN PROGRESS (NO at step ST105) and determining that the finger is out of contact with the input surface 15 (NO at step ST120), at step ST130, the determining part 23 compares a degree of proximity calculated with respect to the finger with a threshold for distance determination, and determines whether the finger is within the distance Lh from the input surface 15 based on the result of the comparison. In response to determining that the finger is within the distance Lh from the input surface 15 (YES at step ST130), the determining part 23 determines that the handwriting operation is continuing, and at step ST135, the stroke information generating part 24 retains stroke information. In this case, the display control part 27 continues to display the path of the contact position of the finger in the handwriting operation display area 46.

If the distance between the finger and the input surface 15 exceeds the distance Lh (NO at step ST130), the process proceeds to steps ST140 and ST145.

At step ST140, the determining part 23 determines the end of the handwriting operation, and sets "0" to the flag Fg. When the handwriting operation ends, at step ST145, the character recognition part 25 recognizes a character expressed by the path of the contact position of the finger based on stroke information generated during the handwriting operation that has ended. Furthermore, the input character determining part 26 determines the character recognized by the character recognition part 25 as the character input by the handwriting operation. The display control part 27 erases the path of the contact position of the finger displayed in the handwriting operation display area 46 of the display part 40, and displays the character determined by the input character determining part 26 in the input result display area 47 of the display part 40 (FIGS. 2B and 3C).

After execution of the process of steps ST105 through ST145, at step ST150, the processing part 20 determines whether to end handwriting input. For example, the processing part 20 ends the process when a command to end a handwriting input process is input at the interface part 50 or when a predetermined operation to give an instruction to end a handwriting input process is performed in an input operation device (such as a keyboard, mouse, or a button) (not depicted) (YES at step ST150). In the case of continuing the handwriting input process, the processing part 20 returns to step ST105 to repeat the above-described process.

As described above, according to this embodiment, when a finger is separated from the input surface 15, by simply positioning the finger within the operation space 100, it is possible to accurately determine that a handwriting operation is continuing. This eliminates the necessity of performing troublesome operations such as depressing a button to indicate that the handwriting operation is continuing. Furthermore, positioning a finger separated from the input surface 15 in the operation space 100 is a natural action in handwriting operation, and is therefore less likely to interrupt a natural action than is pressing a button, or the like. Accordingly, the operability can be significantly improved.

Furthermore, according to this embodiment, by simply moving a finger from within to the outside of the operation space 100 (by simply separating a finger from the input surface 15 by more than the predetermined distance Lh), it is possible to accurately determine the end of a handwriting operation and to determine a character input by the handwriting operation. Accordingly, compared with the case of using, for example, depression of a button for determination of the end of a handwriting operation, the natural action of a handwriting operation is less likely to be interrupted. Therefore, it is possible to further improve the operability.

Furthermore, according to this embodiment, there is no need to wait for a timer to measure time in order to determine the end of a handwriting operation. In the case of determining the end of a handwriting operation using a timer, a user has to wait for a few seconds while positioning a stylus above an input surface after the end of a handwriting operation, before the start of character recognition. Therefore, it is difficult to smoothly input multiple characters. According to this embodiment, which eliminates the necessity of waiting for a timer to measure time, it is possible to smoothly input multiple characters in succession.

Furthermore, according to this embodiment, even when a finger is temporarily separated from the input surface 15 during a handwriting operation, the end of the handwriting operation is not automatically determined as long as a finger is positioned within the operation space 100. Therefore, incorrect input due to the ending of a handwriting operation at an unintended time can be less likely.

Furthermore, according to this embodiment, when it is determined that a handwriting operation is continuing, the path of the contact position of a finger corresponding to stroke information is displayed in the handwriting operation display area 46 of the display part 40, thus facilitating input of characters and the like by handwriting operation. When the termination of the handwriting operation is determined, the path of the contact position of the finger displayed in the handwriting operation display area 46 of the display part 40 is erased, thus making it possible to easily become aware of the end of the handwriting operation.

Furthermore, according to this embodiment, the contact position of a finger on the input surface 15 and the presence or absence of a finger in the operation space 100 are both detected based on a change in capacitance at the sensor element 12. Therefore, compared with the case of using independent sensors for these detections, it is possible to achieve a simplified configuration.

Second Embodiment

Next, a second embodiment according to the present invention is described. A handwriting input device according to this embodiment, in which the operation of the determining part 23 is altered from that of the handwriting input device according to the first embodiment, is equal in overall device configuration to the handwriting input device illustrated in FIG. 1.

According to this embodiment, when the sensor part 10 detects the proximate position of a finger being outside a predetermined operation area 16 on the input surface 15 after the determination of the start of a handwriting operation, the determining part 23 determines the end of this handwriting operation. The term "proximate position of a finger" here refers to the position or point on the input surface 15 closest to a finger separated from the input surface 15. For example, after the determination of the start of a handwriting operation, the determining part 23 monitors the coordinates of a finger as determined as being separated from the input surface 15 among the finger's coordinates calculated based on the detection signals of the sensor part 10 in the coordinates and proximity degree calculating part 22, and determines whether the monitored coordinates have moved outside from within the predetermined operation area 16 on the input surface 15. In response to determining that the monitored coordinates have moved outside from within the predetermined operation area 16, the determining part 23 determines that the handwriting operation has ended. Otherwise, the determining part 23 operates the same as in the above-described first embodiment.

Figure 5A:
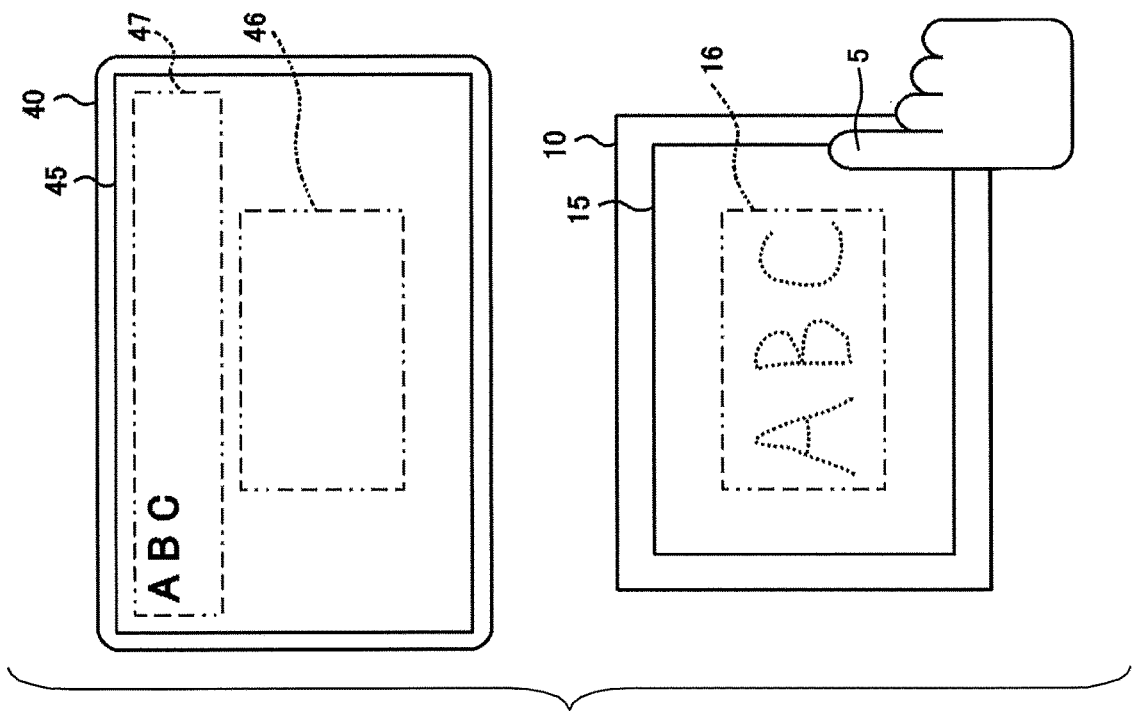
FIGS. 5A and 5B are views in a direction perpendicular to the input surface, illustrating a continuous handwriting operation and an example of display of the display part according to a handwriting input device of a second embodiment, where
Figure 5B:
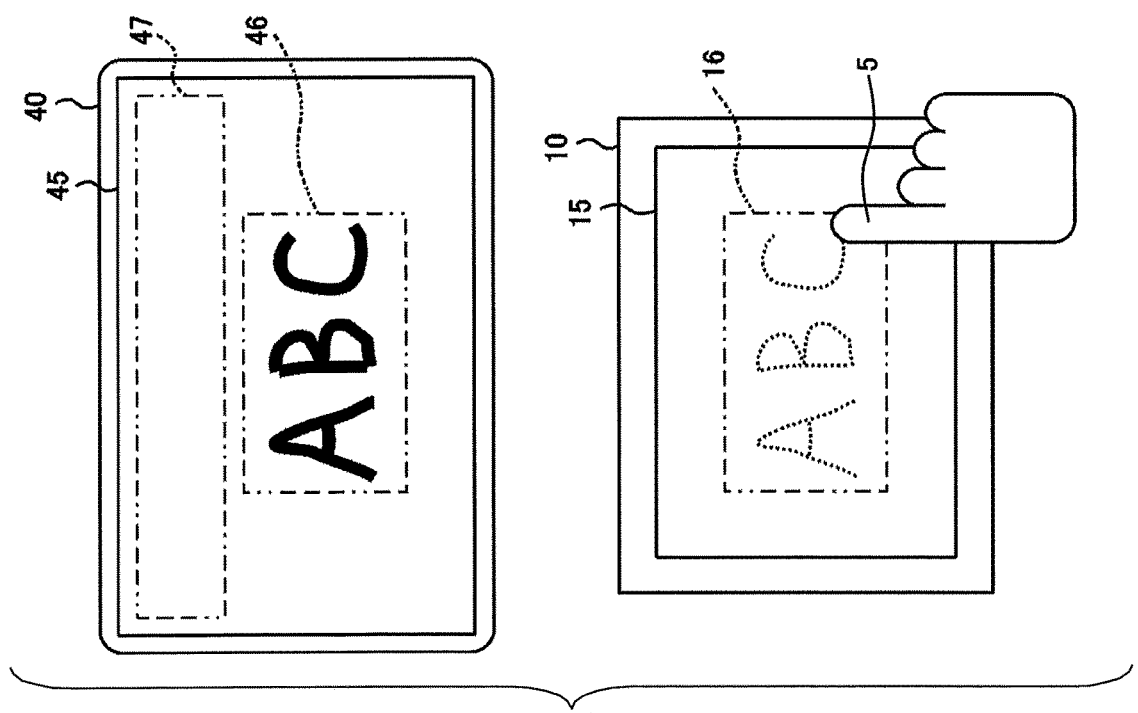

FIGS. 5A and 5B and FIGS. 6A through 6C are diagrams illustrating a continuous handwriting operation and an example of display of the display part 40 according to the handwriting input device of the second embodiment. FIGS. 5A and 5B illustrate views in a direction perpendicular to the input surface 15. FIGS. 6A through 6C illustrate, on the right side, views in a direction parallel to the input surface 15.

According to the handwriting input device of this embodiment, as illustrated in FIGS. 5A and 5B and FIGS. 6A through 6C, the operation area 16 for handwriting operation is set on the input surface 15. A handwriting operation that moves the finger 5 on and in contact with the input surface 15 is performed within this operation area 16. When a handwriting operation is performed, lines corresponding to the path of the contact position of the finger 5 on the input surface 15 (dotted lines on the input surface 15) are displayed in the handwriting operation display area 46 of the display part 40 as illustrated in FIGS. 5A and 6A.

According to this embodiment, as illustrated in FIGS. 6A through 6C, the operation space 100 is a space within the distance Lh from the operation area 16 on the input surface 15. Even when the finger 5 is separated from the input surface 15, the determining part 23 determines that the handwriting operation is continuing as long as the finger 5 is within this operation space 100 as illustrated in FIG. 6B. When the proximate position of the finger 5 is outside the operation area 16 as illustrated in FIG. 6C, the determining part 23 determines the end of the handwriting operation even if the distance between the input surface 15 and the finger 5 is less than or equal to the distance Lh, because the finger 5 is outside the operation space 100.

FIG. 7 is a flowchart for illustrating an operation of the handwriting input device according to the second embodiment. The flowchart illustrated in FIG. 7 is the same as the flowchart illustrated in FIG. 4 except for additionally including step ST131 between steps ST130 and ST135 of FIG. 4. Here, part of the process including the additional process is described.

In response to determining the state of OPERATION IN PROGRESS (NO at step ST105) and determining that the finger is out of contact with the input surface 15 (NO at step ST120), at step ST130, the determining part 23 compares a degree of proximity calculated with respect to the finger with a threshold for distance determination, and determines whether the finger is within the distance Lh from the input surface 15 based on the result of the comparison. In addition, at step ST131, the determining part 23 determines whether the coordinates of the proximate position of the finger determined as being separated from the input surface 15 are within the operation area 16 on the input surface 15. If the finger is within the distance Lh from the input surface 15 and the proximate position of the finger is within the operation area 16 (YES at step ST131), the determining part 23 determines that the handwriting operation is continuing, and at step ST135, the stroke information generating part 24 retains stroke information. In this case, the display control part 27 continues to display the path of the contact position of the finger in the handwriting operation display area 46.

If the distance between the finger and the input surface 15 exceeds the distance Lh (NO at step ST130) or the proximate position of the finger is not within the operation area 16 (NO at step ST131), the process proceeds to steps ST140 and ST145.

As described above, according to this embodiment, by simply moving a finger to move the proximate position of the finger on the input surface 15 to the outside from within the operation area 16, it is possible to accurately determine the end of a handwriting operation and to determine a character input by the handwriting operation. Accordingly, the handwriting operation is closer to its natural action than in the case of using, for example, depression of a button for determination of the end of a handwriting operation. Therefore, it is possible to significantly improve the operability of a handwriting operation.

According to the above-described embodiment, whether or not the distance between a finger and the operation area 16 is less than or equal to the distance Lh and whether the proximate position of the finger is within the operation area 16 are used as conditions for the end of a handwriting operation, while the former condition may be omitted.

Third Embodiment

Next, a third embodiment of the present invention is described. A handwriting input device according to this embodiment, in which the operation of the determining part 23 is altered from that of the handwriting input device of the first or the second embodiment, is equal in overall device configuration to the handwriting input devices of the first and the second embodiment.

According to this embodiment, the determining part 23 determines the end of a handwriting operation when the absence of a finger in the operation space 100 is continuously detected for a predetermined time or more in the sensor part 10 after the determination of the start of the handwriting operation. The determining part 23 determines that the handwriting operation is continuing even when the finger moves outside the operation space 100, on condition that the finger returns to the operation space 100 before the passage of the predetermined time. Otherwise, the determining part 23 operates the same as in the above-described embodiments.

Figure 8A:
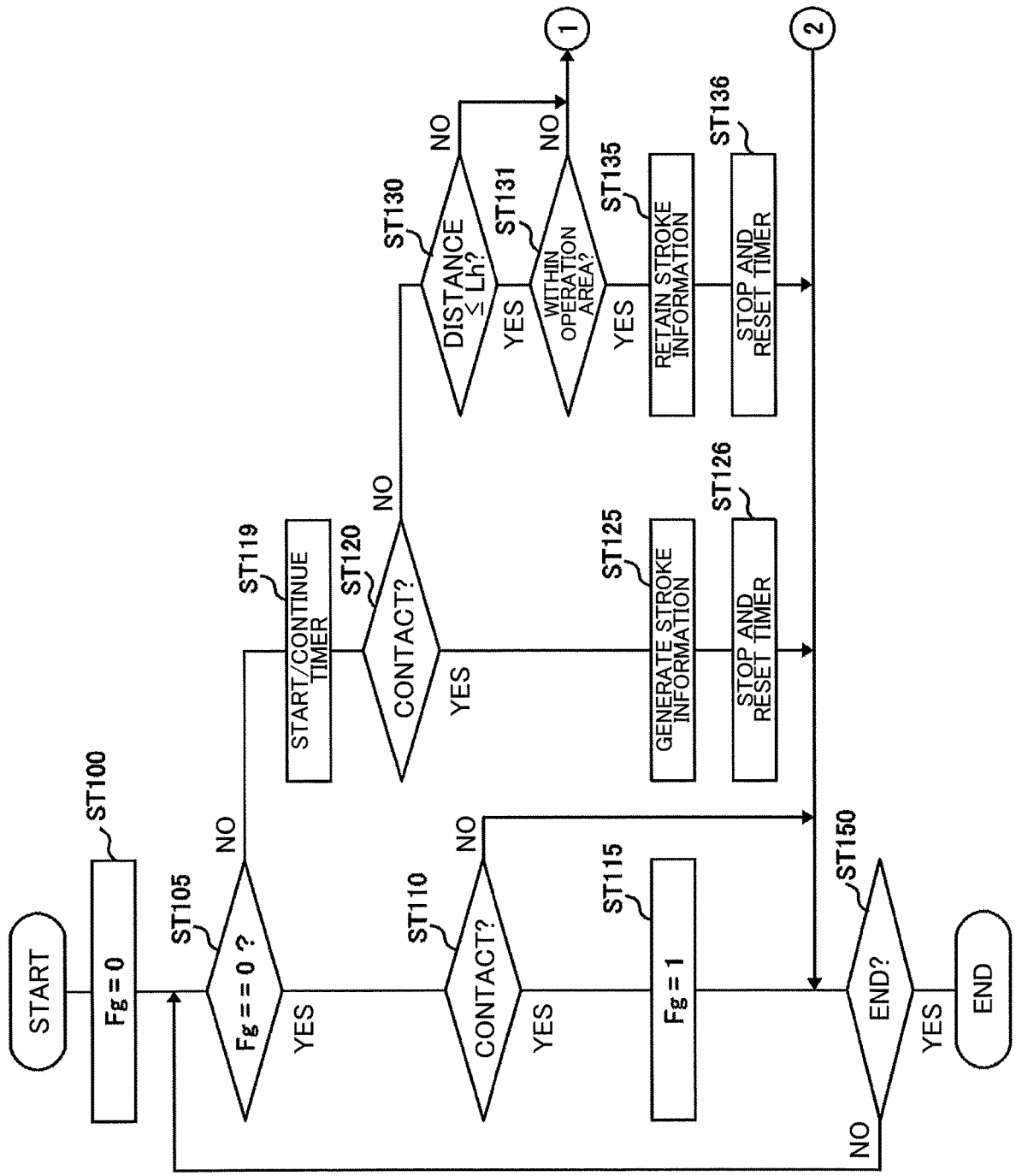

FIGS. 8A and 8B are flowcharts for illustrating an operation of the handwriting input device according to the third embodiment. The flowcharts illustrated in FIGS. 8A and 8B are the same as the flowchart illustrated in FIG. 7 except for additionally incorporating steps ST119, ST126, ST136, ST139, and ST146 into the flowchart of FIG. 7. Here, part of the process including the additional process is described.

If the flag Fg indicates the state of OPERATION IN PROGRESS (NO at step ST105), at step ST119, the determining part 23 starts measuring time with a timer. For example, the determining part 23 counts the number of periodically generated clock pulses as a time measurement value. When the measurement of time with a timer is already in action, the determining part 23 continues the measurement of time.

In response to determining that the finger is in contact with the input surface 15 with the flag Fg indicating the state of OPERATION IN PROGRESS (YES at step ST120), at step ST126, the determining part 23 stops measuring time and resets the time measurement value. Furthermore, even in the case of determining that the finger is not in contact with the input surface 15 with the flag Fg indicating the state of OPERATION IN PROGRESS (NO at step ST120), in response to determining that the finger is positioned within the operation space 100 (YES at steps ST130 and ST131), at step ST136, the determining part 23 stops measuring time and resets the time measurement value.

In response to determining that the finger is not in contact with the input surface 15 with the flag Fg indicating the state of OPERATION IN PROGRESS (NO at step ST120) and determining that the finger is not positioned within the operation space 100 (NO at step ST130 or ST131), at step ST139, the determining part 23 determines whether the time measurement value of the timer has reached a predetermined time.

In response to determining that the time measurement value of the timer has reached a predetermined time (YES at step ST139), at step ST140, the determining part 23 determines the end of the handwriting operation, and sets "0" to the flag Fg. When the handwriting operation ends, at step ST145, the character recognition part 25 performs character recognition based on stroke information, and the input character determining part 26 determines the character recognized by the character recognition part 25 as a character input by the handwriting operation. Furthermore, at step ST146, the determining part 23 stops measuring time and resets the time measurement value.

In response to determining that the time measurement value of the timer has not reached a predetermined time (NO at step ST139), the process proceeds to step ST150, and if the handwriting operation is continuing, the process returns to step ST105 to repeat the same process.

As described above, according to this embodiment, even when a finger is moved outside the operation space 100 for a temporary period without intention, a handwriting operation is not determined as being ended if the period is shorter than a predetermined time. Therefore, incorrect input of a character due to determination of the end of a handwriting operation at an unintended time can be even less likely.

According to the flowcharts of FIGS. 8A and 8B, the time measuring process of a timer is added to the flowchart of the second embodiment illustrated in FIG. 7. Alternatively, the same time measuring process may be added to the flowchart of the first embodiment illustrated in FIG. 4.

Fourth Embodiment

Next, a fourth embodiment of the present invention is described. A handwriting input device according to this embodiment, in which the operations of the character recognition part 25, the input character determining part 26, and the display control part 27 are altered from those of the handwriting input device of the first, the second, or the third embodiment, is equal in overall device configuration to the handwriting input devices of the first, the second, and the third embodiment.

According to this embodiment, the character recognition part 25 recognizes multiple possible input characters (including sets of characters) based on stroke information. Furthermore, the character recognition part 25 performs character recognition every time stroke information is generated and updated during the period of a handwriting operation. Otherwise, the character recognition part 25 operates the same as in the above-described embodiments.

Figure 9B:
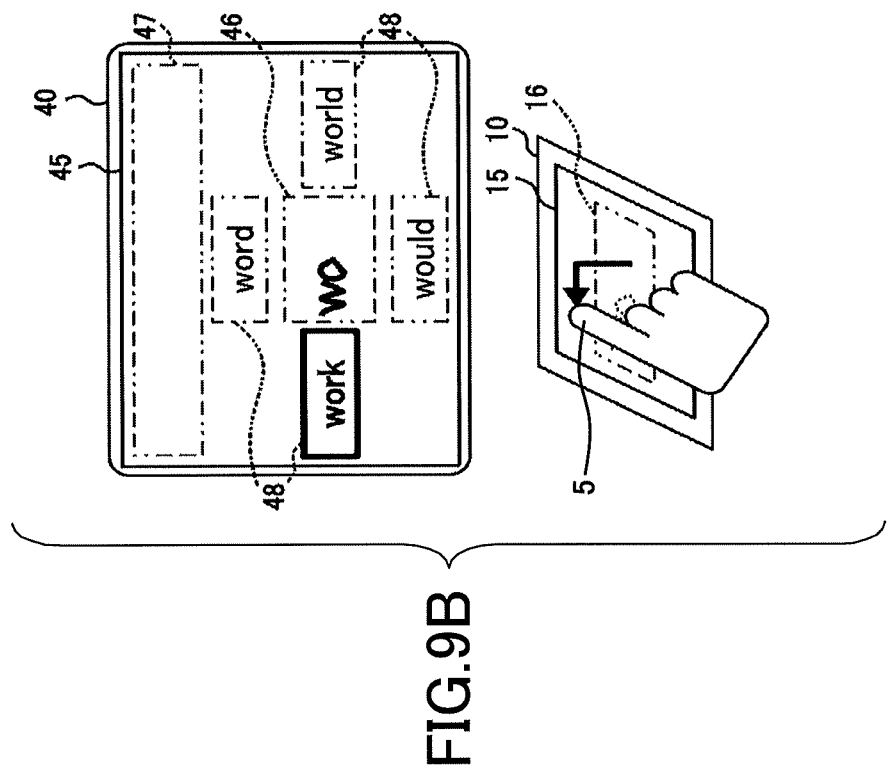
Figure 9A:
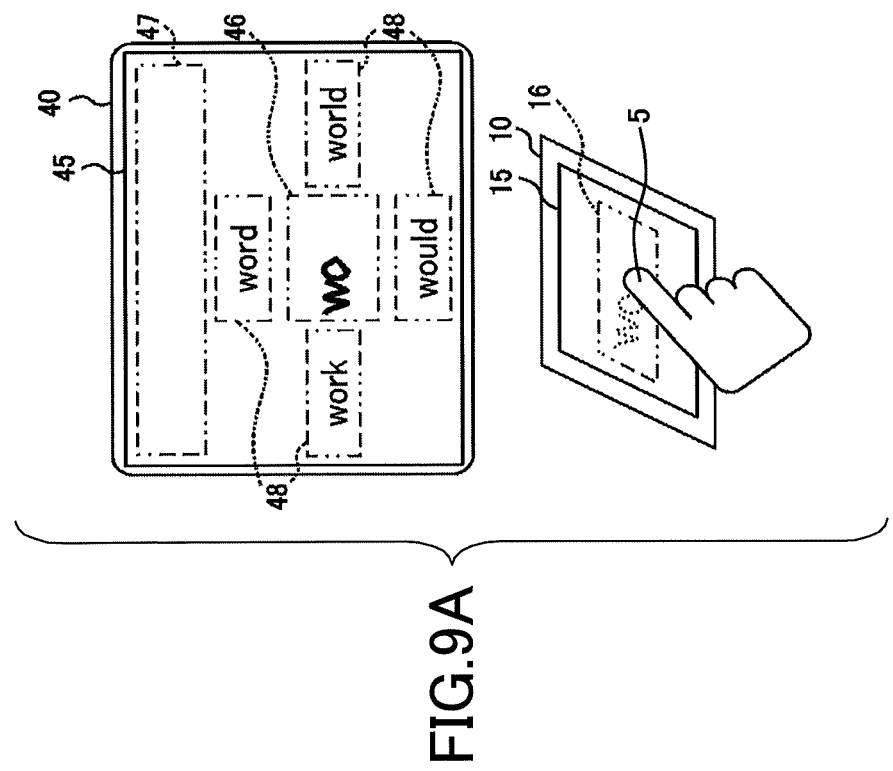

According to this embodiment, when the continuance of a handwriting operation is determined by the determining part 23, the display control part 27 displays multiple possible input characters recognized by the character recognition part 25 based on stroke information generated during the continuing handwriting operation in possible input display areas 48 of the display part 40. For example, as illustrated in FIGS. 9A through 9C described below, the display control part 27 places the possible input display areas 48 around the handwriting operation display area 46, and displays possible input characters one in each of the possible input display areas 48. Otherwise, the display control part 27 operates the same as in the above-described embodiments.

According to this embodiment, the input character determining part 26 determines a character input by a handwriting operation from among multiple possible input characters displayed in the possible input display areas 48 of the display part 40, based on a direction in which the proximate position of a finger on the input surface 15 moves when the finger moves outside the operation space 100. For example, the input character determining part 26 determines the travel direction of the proximate position of a finger based on a series of coordinates of the proximate position calculated by the coordinates and proximity degree calculating part 22 during a period around a time at which the finger moves outside from within the operation space 100. The travel directions that can be determined by the input character determining part 26 correspond one-to-one to the possible input display areas 48 placed around the handwriting operation display area 46. In response to determining a travel of the proximate position of the finger in one travel direction when the finger moves outside the operation space 100, the input character determining part 26 determines a possible input character displayed in one of the possible input display area 48 corresponding to the one travel direction as a character input by the handwriting operation.

FIGS. 9A through 9C are diagrams illustrating a continuous handwriting operation and an example of display of the display part 40 according to the handwriting input device of the fourth embodiment. The lower figures of FIGS. 9A through 9C are perspective views of the input surface 15. FIG. 9A illustrates a state where the finger 5 is in contact with the input surface 15. FIG. 9B illustrates a state where the finger 5 travels leftward to move outside from within the operation space 100. FIG. 9C illustrates a state where an input character is determined with the finger 5 outside the operation space 100.

In the illustration of FIGS. 9A through 9C, the handwriting operation display area 46 is a rectangular area, and the possible input display areas 48 are arranged one on each of the four sides of the rectangular area. Every time the stroke information generating part 24 generates and updates stroke information expressing the path of the contact position of the finger 5, four possible input characters corresponding to the stroke information are recognized by the character recognition part 25 to be displayed in the four possible input display areas 48 of the display part 40.

In the illustration of FIG. 9B, the finger 5 moves outside the operation space 100 while traveling leftward. Therefore, the input character determining part 26 determines that the travel direction of the proximate position of the finger 5 is a leftward direction. As a result, a possible input word (set of characters) "work" displayed in the possible input display area 48 positioned on the left side on a screen 45 is determined as a word (a set of characters) input by handwriting operation. The determined word moves to the input result display area 47 as illustrated in FIG. 9C. When the handwriting operation ends, the handwriting operation display area 46 and possible input display areas 48 on the display are all cleared to wait for the next handwriting operation.

Figure 10:
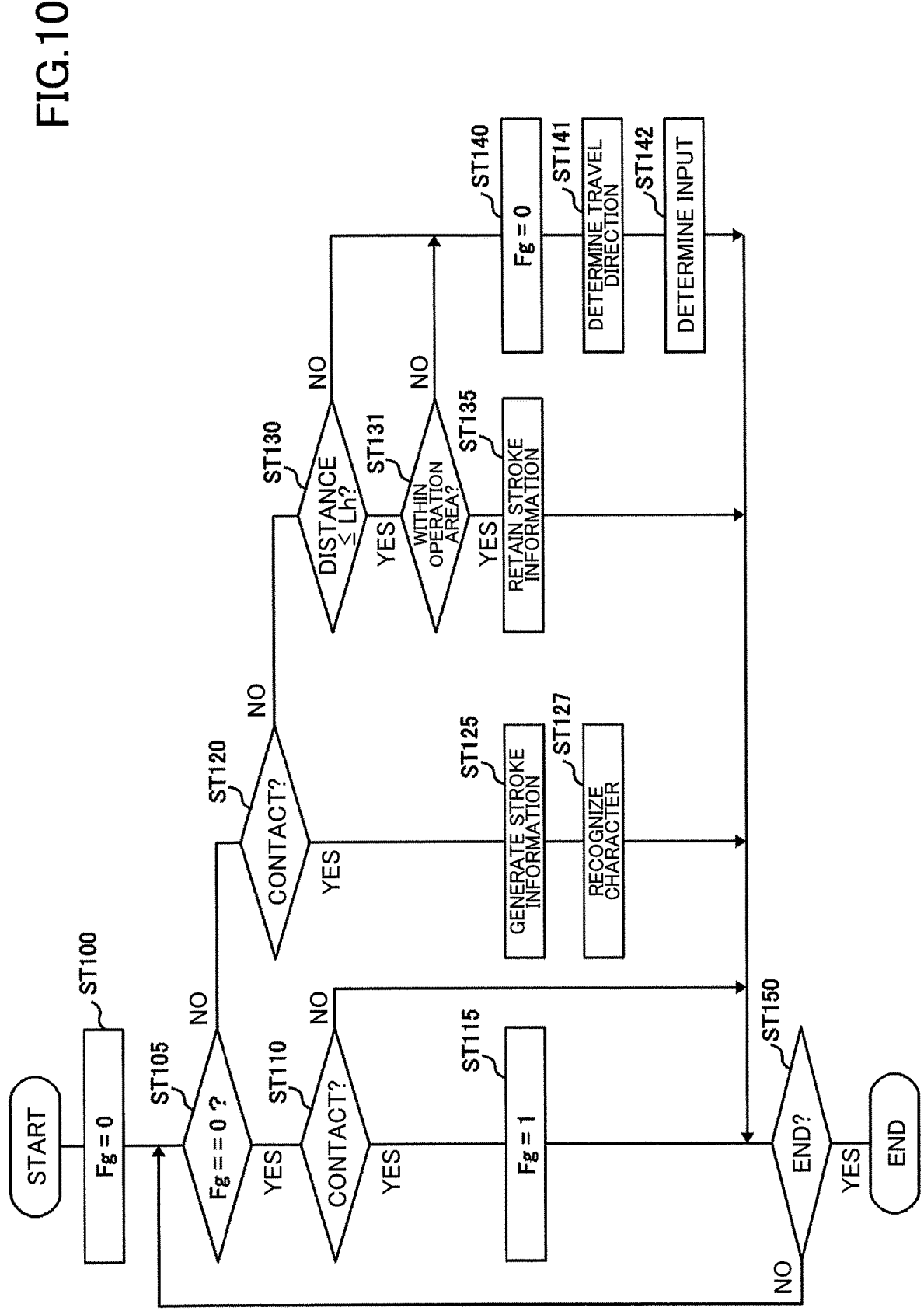
FIG. 10 is a flowchart for illustrating an operation of the handwriting input device according to the fourth embodiment.

FIG. 10 is a flowchart for illustrating an operation of the handwriting input device according to the fourth embodiment. The flowchart illustrated in FIG. 10 is the same as the flowchart illustrated in FIG. 7 except that step ST145 of the flowchart of FIG. 7 is replaced with steps ST141 and ST142 and step ST127 is added. Here, part of the process altered and including the additional process is described.

In response to the determining part 23 determining that the finger is in contact with the input surface 15 with the flag Fg indicating the state of OPERATION IN PROGRESS (YES at step ST120), at step ST125, the stroke information generating part 24 acquires the coordinates of the finger in contact calculated by the coordinates and proximity degree calculating part 22, and generates and updates stroke information. At step ST127, the character recognition part 25 recognizes multiple possible input characters based on the generated and updated stroke information. The character recognition part 25 performs character recognition every time the stroke information is generated and updated during the handwriting operation.

In response to determining that the finger is not in contact with the input surface 15 with the flag Fg indicating the state of OPERATION IN PROGRESS (NO at step ST120) and determining that the finger is not positioned within the operation space 100 (NO at step ST130 or ST131), at step ST140, the determining part 23 determines the end of the handwriting operation, and sets "0" to the flag Fg. At this point, at step ST141, the input character determining part 26 determines the travel direction of the proximate position of the finger based on the coordinates of the proximate position calculated by the coordinates and proximity degree calculating part 22 during a period around a time at which the finger moves outside from within the operation space 100. At step ST142, the input character determining part 26 determines, as a character input by the handwriting operation, the possible input character displayed in the possible input display area 48 corresponding to the travel direction determined at step ST141 among the possible input display areas 48 of the display part 40. For example, in the case illustrated in FIGS. 9A through 9C, the input character determining part 26 determines whether the travel direction of the proximate position of the finger is a leftward direction, a rightward direction, an upward direction, or a downward direction, and based on the result of the determination, determines, as a character input by the handwriting operation, the possible input character displayed in the possible input display area 48 positioned on the left side, the right side, the upper side, or the lower side of the handwriting operation display area 46.

As described above, according to this embodiment, when a handwriting operation ends, by simply controlling the travel direction of a finger appropriately as the finger moves outside the operation space 100, it is possible to easily determine a character input by the handwriting operation from among multiple possible input characters displayed in the display part 40. Accordingly, it is possible to more smoothly input a character by handwriting operation than in the case of performing a troublesome operation such as depression of a button to select an objective character from among multiple possible input characters.

Fifth Embodiment

Next, a fifth embodiment of the present invention is described. A handwriting input device according to this embodiment, in which the operations of the character recognition part 25, the input character determining part 26, and the display control part 27 are altered from those of the handwriting input device of the first, the second, or the third embodiment, is equal in overall device configuration to the handwriting input devices of the first, the second, and the third embodiment.

According to this embodiment, the character recognition part 25 recognizes multiple possible input characters (including sets of characters) based on stroke information. Furthermore, the character recognition part 25 performs character recognition every time stroke information is generated and updated during the period of a handwriting operation. Otherwise, the character recognition part 25 operates the same as in the above-described embodiments.

According to this embodiment, when the continuance of a handwriting operation is determined by the determining part 23, the display control part 27 displays multiple possible input characters recognized by the character recognition part 25 based on stroke information generated during the continuing handwriting operation in possible input display areas 49 of the display part 40. For example, as illustrated in FIGS. 11A through 11C and FIGS. 12A through 12C described below, the display control part 27 aligns the possible input display areas 49 in one direction, and displays possible input characters one in each of the possible input display areas 49.

In addition, when the input character determining part 26 selects one possible input character as described below, the display control part 27 performs highlighting (highlight display) to indicate that the one possible input character is being selected in the display part 40. For example, the display control part 27 performs highlighting by altering the frame, background color, brightness, shape or the like of the possible input display area 49 of a selected possible input character, altering the color, thickness, font or the like of a selected possible input character, or adding an icon indicating that a possible input character is being selected.

Otherwise, the display control part 27 operates the same as in the above-described embodiments.

According to this embodiment, when the sensor part 10 detects that a finger is within the operation space 100, the input character determining part 26 selects one possible input character from among multiple possible input characters displayed in the possible input display areas 49 of the display part 40 based on the travel (movement) pattern of the proximate position of the finger.

For example, when a finger separated from the input surface 15 is within the operation space 100, the input character determining part 26 calculates, for example, the travel direction and velocity of the proximate position of the finger based on a series of coordinates of the proximate position calculated by the coordinates and proximity degree calculating part 22. The input character determining part 26 determines which one of predetermined travel patterns corresponds to the travel pattern of the proximate position of the finger, based on the calculated travel direction and velocity.

Travel patterns that the input character determining part 26 can determine (distinguish) are associated with corresponding methods each switching an object of selection from one possible input character to another. For example, multiple possible input characters recognized by the character recognition part 25 have respective ranks in the estimation of character recognition, and some travel patterns are correlated with corresponding methods of switching an object of selection based on the ranks. Specifically, different travel patterns are correlated with, for example, a method that switches an object of selection to move down the ranks one by one and a method that switches an object of selection to move up the ranks one by one, respectively. In response to determining that the travel pattern of the proximate position of a finger matches one travel pattern among the predetermined travel patterns, the input character determining part 26 switches the object of selection from one possible input character that is being selected to another possible input character, according to the method of switching an object of selection correlated with the one travel pattern.

Immediately after the separation of a finger from the input surface 15, the input character determining part 26 may select a particular possible input character from among multiple possible input characters. For example, the input character determining part 26 may select the highest-ranked possible input character in the estimation of character recognition in the character recognition part 25, immediately after the separation of a finger from the input surface 15.

In response to the determining part 23 determining the end of a handwriting operation while one possible input character is being selected, the input character determining part 26 determines the possible input character that is being selected as a character input by the handwriting operation.

Figure 11B:
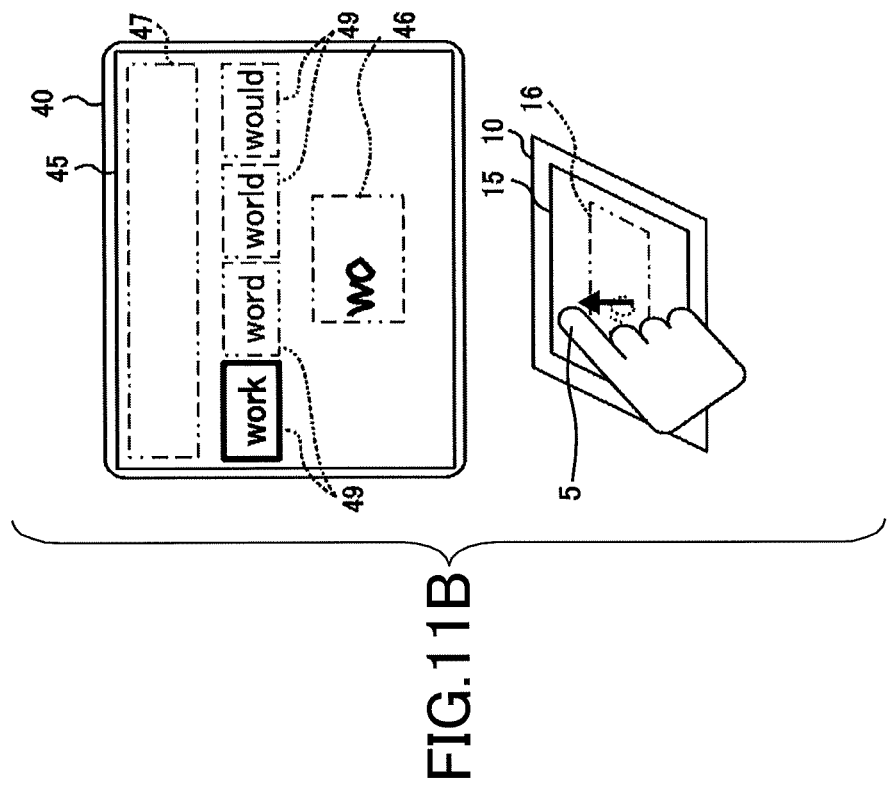
FIGS. 11A through 11F are diagrams illustrating a continuous handwriting operation and an example of display of the display part according to a handwriting input device of a fifth embodiment, including perspective views of the input surface on the lower side, where
Figure 11A:
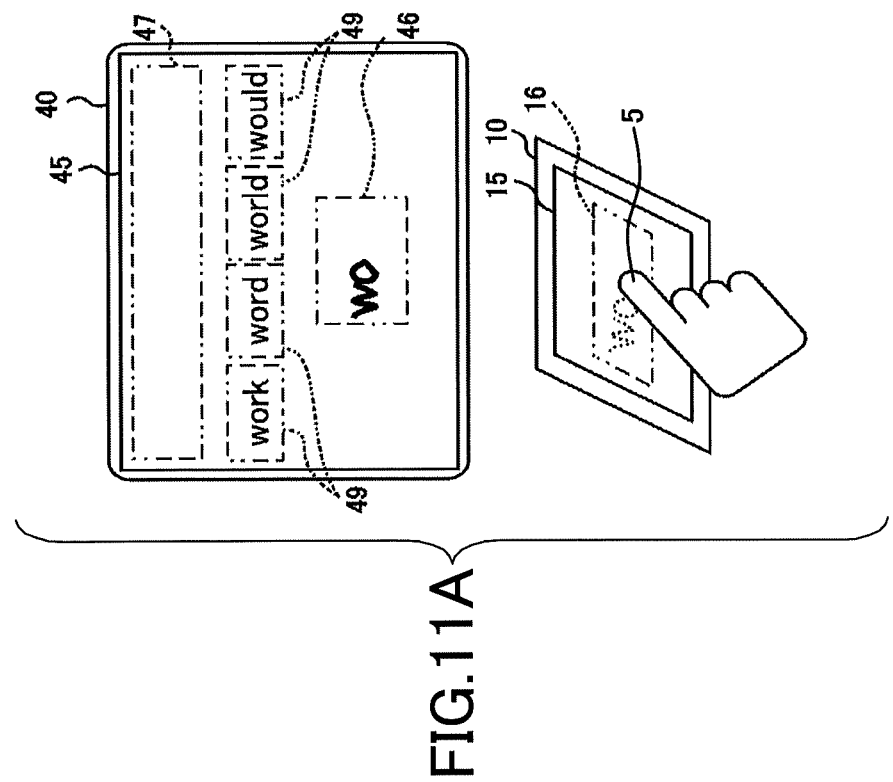
Figure 11C:
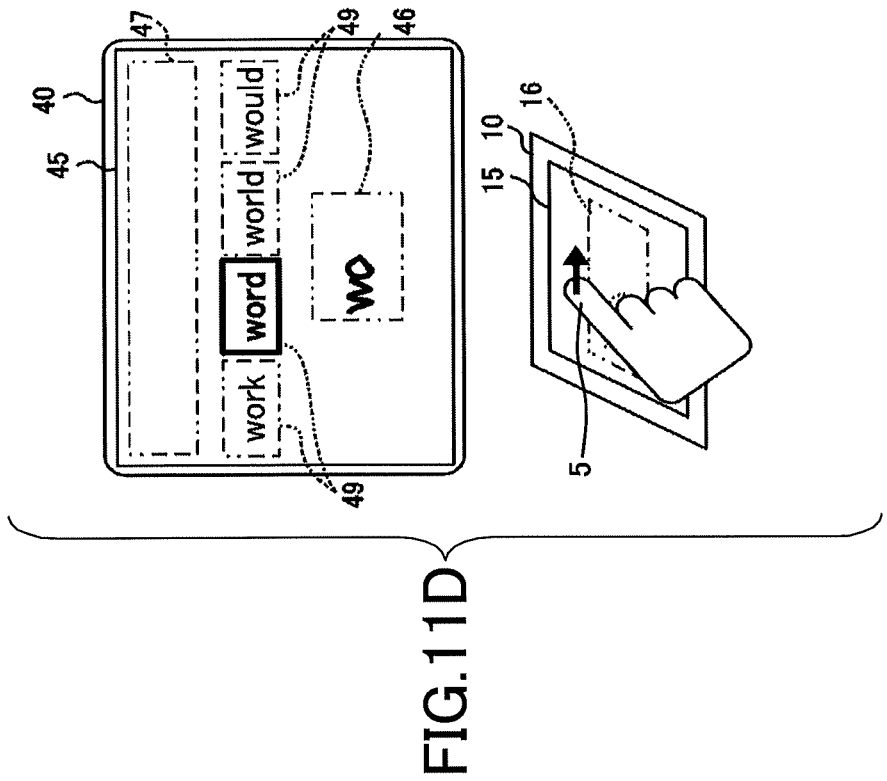
Figure 11D:
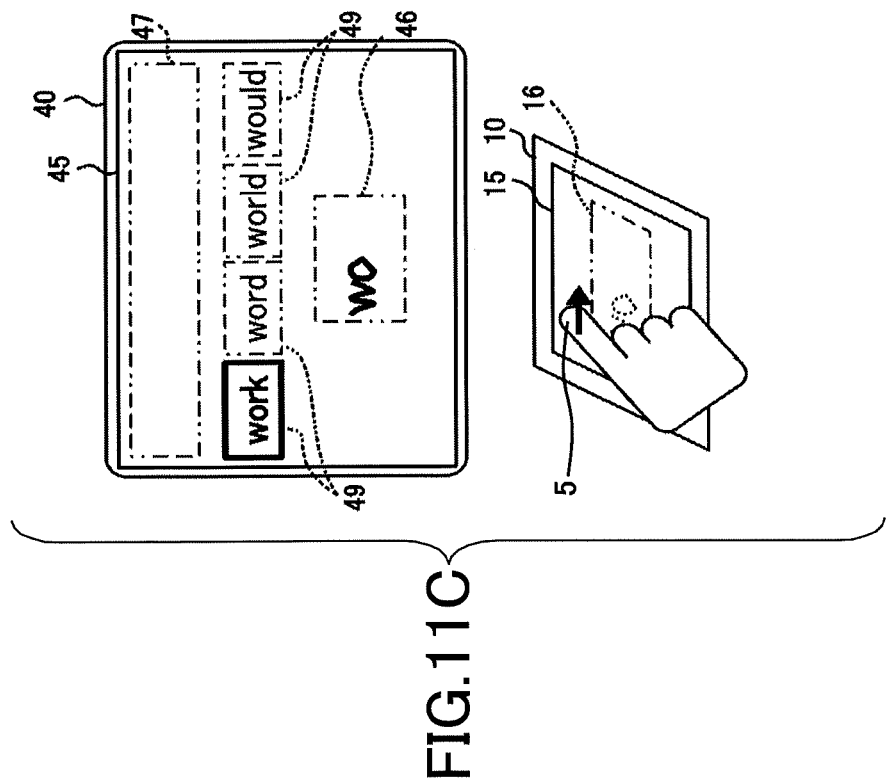
Figure 11E:
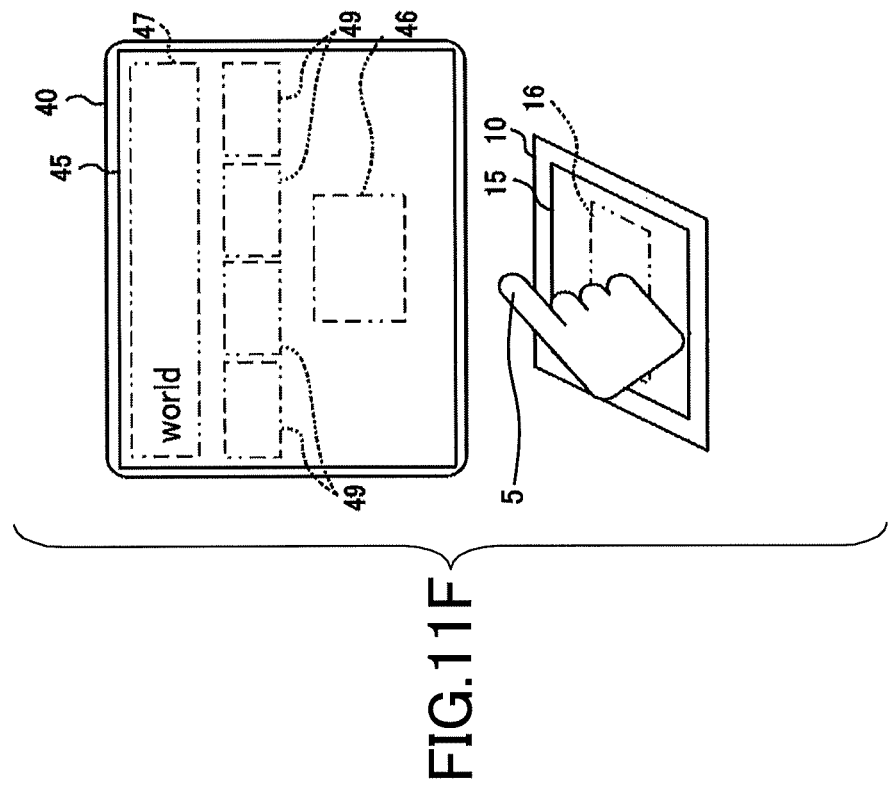
Figure 11F:
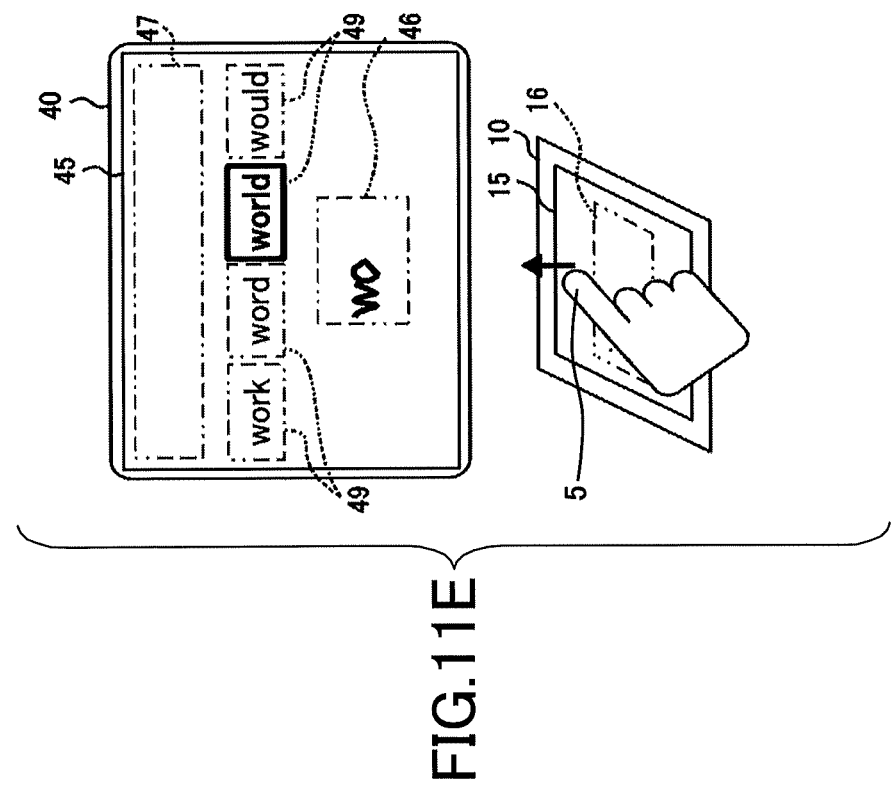

FIGS. 11A through 11F are diagrams illustrating a continuous handwriting operation and an example of display of the display part 40 according to the handwriting input device of the fifth embodiment. The lower figures of FIGS. 11A through 11F are perspective views of the input surface 15. FIG. 11A illustrates a state where the finger 5 is in contact with the input surface 15. FIG. 11B illustrates a state where the finger 5 is separated from the input surface 15 and is within the operation space 100. FIG. 11C illustrates a state where the finger 5 is separated from the input surface 15 and travels rightward within the operation space 100. FIG. 11D illustrates a state where the finger 5 is separated from the input surface 15 and travels further rightward within the operation space 100. FIG. 11E illustrates a state where the finger 5 moves outside from within the operation space 100. FIG. 11F illustrates a state where an input character is determined with the finger 5 outside the operation space 100.

Immediately after the separation of the finger 5 from the input surface 15, the input character determining part 26 selects the highest-ranked possible input character in the estimation of character recognition in the character recognition part 25. In the illustration of FIGS. 11A through 11F, the possible input characters are arranged in descending order of rank from left to right with the leftmost possible input character being ranked the highest. Accordingly, as illustrated in FIG. 11B, immediately after the separation of the finger 5 from the input surface 15, highlighting is performed in the leftmost possible input display area 49.

When the finger 5 is separated from the input surface 15 within the operation space 100, a horizontal movement of the proximate position of the finger 5 is determined as a travel pattern. For example, as illustrated in FIGS. 11C through 11E, as the finger 5 moves rightward, the proximate position of the finger 5 on the input surface 15 as well moves rightward. Therefore, the input character determining part 26 determines that the travel pattern is "rightward." The "rightward" travel pattern is correlated with a method of switching an object of selection to move down the ranks of the estimation of character recognition in the character recognition part 25 one by one. Therefore, the selected possible input character as well moves rightward on the screen 45 of the display part 40. That is, the highlighted possible input display area 49 moves rightward in the four possible input display area 49. In the illustration of FIGS. 11C through 11E, the "rightward" travel pattern is determined two consecutive times when the leftmost possible input display area 49 is highlighted. Therefore, the highlighted possible input display area 49 moves to the third possible input display area 49 from the left. Meanwhile, a "leftward" travel pattern is correlated with a method of switching an object of selection to move up the ranks of the estimation of character recognition in the character recognition part 25 one by one. Therefore, when a travel pattern is determined as being "leftward," the highlighted possible input display area 49 moves leftward.

When the finger 5 moves outside the operation space 100 with one of the possible input display areas 49 being highlighted, a character displayed in the highlighted one of the possible input display areas 49 is determined as a character input by handwriting operation. In the illustration of FIGS. 11E and 11F, the finger 5 moves outside the operation space 100 when the third possible input display area 49 from the left is highlighted. Therefore, a word "world" displayed in this possible input display area 49 is determined as a character (a set of characters) input by handwriting operation. The determined character moves to the input result display area 47 as illustrated in FIG. 11F. When the handwriting operation ends, the handwriting operation display area 46 and possible input display areas 49 on the display are all cleared to wait for the next handwriting operation.

Figure 12:
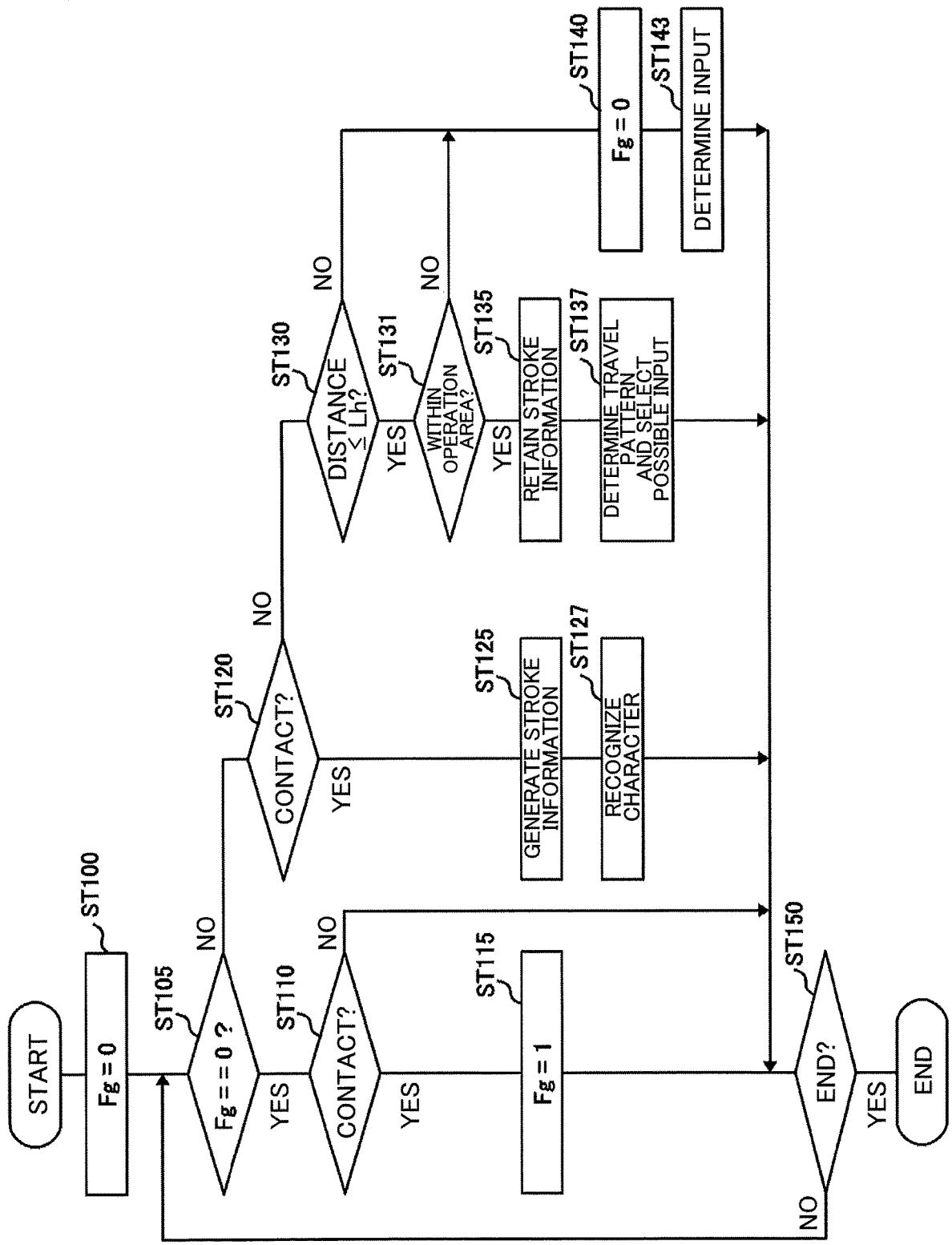
FIG. 12 is a flowchart for illustrating an operation of the handwriting input device according to the fifth embodiment.

FIG. 12 is a flowchart for illustrating an operation of the handwriting input device according to the fifth embodiment. The flowchart illustrated in FIG. 12 is the same as the flowchart illustrated in FIG. 7 except that step ST145 of the flowchart of FIG. 7 is replaced with steps ST143 and steps ST127 and ST137 are added. Here, part of the process altered and including the additional process is described.

In response to the determining part 23 determining that the finger is in contact with the input surface 15 with the flag Fg indicating the state of OPERATION IN PROGRESS (YES at step ST120), at step ST125, the stroke information generating part 24 acquires the coordinates of the finger in contact calculated by the coordinates and proximity degree calculating part 22, and generates and updates stroke information. At step ST127, the character recognition part 25 recognizes multiple possible input characters based on the generated and updated stroke information. The character recognition part 25 performs character recognition every time the stroke information is generated and updated during the handwriting operation.

In response to determining that the finger is not in contact with the input surface 15 with the flag Fg indicating the state of OPERATION IN PROGRESS (NO at step ST120) and determining that the finger is positioned within the operation space 100 (YES at steps ST130 and ST131), at step ST137, the input character determining part 26 determines the travel pattern of the proximate position of the finger based on a series of coordinates of the proximate position calculated by the coordinates and proximity degree calculating part 22. In response to determining that the travel pattern of the proximate position of the finger matches one travel pattern among predetermined travel patterns, the input character determining part 26 selects one possible input character from among the possible input characters displayed in the possible input display areas 49 of the display part 40 based on the one travel pattern. The display control part 27 highlights the possible input character selected by the input character determining part 26 in the display part 40. If no travel pattern is determined (for example, if there is no movement of the finger or the movement of the finger is insufficient), the input character determining part 26 keeps the currently selected possible input character selected.

In response to determining that the finger is not in contact with the input surface 15 with the flag Fg indicating the state of OPERATION IN PROGRESS (NO at step ST120) and determining that the finger is not positioned within the operation space 100 (NO at step ST130 or ST131), at step ST140, the determining part 23 determines the end of the handwriting operation, and sets "0" to the flag Fg. At step ST143, the input character determining part 26 determines the possible input character selected at this point as a character input by the handwriting operation.

As described above, according to this embodiment, by simply moving a finger within the operation space 100 so that the travel pattern of the finger is determined as a predetermined travel pattern, it is possible to select one possible input character from among multiple possible input characters displayed in the display part 40. This allows one possible input character to be easily selected from among multiple possible input characters without performance of a troublesome operation such as depression of a button, thus making it possible to significantly improve operability.

Furthermore, according to this embodiment, when one possible input character is selected, the display part 40 performs highlighting to indicate that the one possible input character is being selected. This makes it easier to confirm the result of selecting a possible input character, thus making it possible to smoothly input a character by handwriting operation.

Furthermore, according to this embodiment, by simply moving a finger outside from within the operation space 100 when one possible input character is selected, it is possible to determine the one possible input character as a character input by handwriting operation without performing a troublesome operation such as depression of a button, thus making it possible to further improve operability.

The present invention is not limited to the specifically disclosed embodiments, and variations and modifications may be made without departing from the scope of the present invention.

For example, according to the above-described embodiments, the input surface 15 of the sensor part 10 and the screen 45 of the display part 40 are provided independent of each other. The present invention, however, is not limited to this configuration, and embodiments of the present invention may use a device such as a touchscreen into which the input surface of a sensor part and the screen of a display part are combined as a unit.

The combinations of elements as illustrated in the above-described embodiments are examples, and the present invention is not limited to these. For example, one or more elements included in one of the above-described embodiments may replace one or more elements included in another one or more of the above-described embodiments. Furthermore, to one of the above-described embodiments, one or more elements included in another one or more of the above-described embodiments may be added.

A first aspect of the present invention relates to a handwriting input device which, in response to a handwriting operation that moves an object on and in contact with an input surface, inputs information corresponding to the path of the contact position of the object on the input surface. The handwriting input device according to the first aspect includes a sensor part configured to detect the contact position of the object on the input surface and the presence or absence of the object within a predetermined operation space adjacent to the input surface and a determining part configured to determine the start and the end of the handwriting operation based on the detection result of the sensor part. The determining part is configured to determine the continuance of the handwriting operation in response to detecting the presence of the object within the operation space by the sensor part after determining the start of the handwriting operation.

According to the above-described configuration, when the object (such as a finger or a stylus) is separated from the input surface, by simply positioning the finger or stylus within the operation space, the continuance of the handwriting operation is accurately determined without performance of a troublesome operation such as depression of a button.

Suitably, the determining part may be configured to determine the end of the handwriting operation in response to detecting the absence of the object within the operation space by the sensor part after determining the start of the handwriting operation.

According to the above-described configuration, by simply moving the finger or stylus from within to the outside of the operation space, the end of the handwriting operation is accurately determined without performance of a troublesome operation such as depression of a button. Because there is no need to wait for a timer to measure time in order to determine the end of the handwriting operation, it is possible to smoothly input information by handwriting operation. As long as the finger or stylus is positioned within the operation space, the end of the handwriting operation is not determined. Therefore, incorrect input of a character due to determination of the end of the handwriting operation at an unintended time is less likely.

Suitably, the determining part may be configured to determine the end of the handwriting operation in response to detecting the absence of the object within the operation space continuously for a predetermined time or more by the sensor part after determining the start of the handwriting operation.

According to the above-described configuration, even when the finger or stylus is moved outside the operation space for a temporary period without intention, the handwriting operation is not determined as being ended if the period is shorter than the predetermined time. Therefore, incorrect input of a character due to determination of the end of the handwriting operation at an unintended time is even less likely.

Suitably, the sensor part may be configured to output a detection signal corresponding to the distance between the object and the input surface. The determining part may be configured to determine the end of the handwriting operation in response to the distance indicated by the detection signal output by the sensor part exceeding a predetermined distance after determining the start of the handwriting operation.

According to the above-described configuration, by simply separating the finger or stylus from the input surface by more than the predetermined distance, it is possible to accurately determine the end of the handwriting operation without performing a troublesome operation such as depression of a button.

Suitably, the sensor part may be configured to detect the proximate position of the object on the input surface with the object being separated from the input surface. The determining part may be configured to determine the end of the handwriting operation in response to detecting the proximate position being outside a predetermined operation area on the input surface by the sensor part after determining the start of the handwriting operation.

According to the above-described configuration, by simply moving the finger or stylus so that the proximate position on the input surface moves from within to the outside of the operation area, the end of the handwriting operation is accurately determined without performance of a troublesome operation such as depression of a button.

Suitably, the handwriting input device according to the first aspect may further include a stroke information generating part configured to generate stroke information corresponding to the path of the contact position detected by the sensor part during the handwriting operation whose start is determined by the determining part, a character recognition part configured to recognize a character expressed by the path of the contact position, based on the stroke information, and an input character determining part configured to determine a character input by the handwriting operation, based on the recognition result of the character recognition part based on the stroke information generated during the handwriting operation, in response to determining the end of the handwriting operation by the determining part.

According to the above-described configuration, by simply moving the finger or stylus from within to the outside of the operation space, a character input by the handwriting operation is determined based on the result of character recognition based on the stroke information generated during the handwriting operation without performance of a troublesome operation such as depression of a button. Because there is no need to wait for a timer to measure time in order to determine the end of the handwriting operation, it is possible to smoothly input a character. As long as the finger or stylus is positioned within the operation space, a character input by the handwriting operation is not determined. Therefore, incorrect input due to determination of an input character at an unintended time is less likely.

Suitably, the handwriting input device according to the first aspect may further include a display part and a display control part configured to display, in the display part, multiple possible input characters recognized by the character recognition part based on the stroke information generated during the handwriting operation, in response to determining the continuance of the handwriting operation by the determining part. The sensor part may be configured to detect the proximate position of the object on the input surface with the object being separated from the input surface. The input character determining part may be configured to determine the character input by the handwriting operation from among the multiple possible input characters displayed in the display part, based on a direction in which the proximate position travels when the object moves outside the operation space.

According to the above-described configuration, when the handwriting operation ends, by simply controlling the travel direction of the finger or stylus appropriately as the finger moves outside the operation space, a character input by the handwriting operation is determined from among multiple possible input characters displayed in the display part without performance of a troublesome operation such as depression of a button.

Suitably, the handwriting input device according to the first aspect may further include a display part and a display control part configured to display, in the display part, multiple possible input characters recognized by the character recognition part based on the stroke information generated during the handwriting operation, in response to determining the continuance of the handwriting operation by the determining part. The sensor part may be configured to detect a proximate position of the object on the input surface with the object being separated from the input surface. The input character determining part may be configured to, in response to detecting the presence of the object within the operation space by the sensor part, select one possible input character from among the multiple possible input characters displayed in the display part, based on the pattern of the travel of the proximate position. The display control part may be configured to, in response to selecting the one possible input character by the input character determining part, perform highlighting in the display part to indicate that the one possible input character is being selected. The input character determining part may be configured to, in response to determining the end of the handwriting operation by the determining part with the one possible input character being selected, determine the one possible input character as the character input by the handwriting operation.

According to the above-described configuration, by moving the finger or stylus within the operation space, one possible input character is selected from among the multiple possible input characters displayed in the display area based on the travel pattern of the proximate position. Therefore, by simply moving the finger or stylus within the operation space so that the proximate position travels in a predetermined pattern, one possible input character is easily selected from the multiple possible input characters without performance of a troublesome operation such as depression of a button.

Once one possible input character is selected, highlighting to indicate that the one possible input character is being selected is performed in the display part. Therefore, it is easier to confirm the result of selecting a possible input character.

By simply moving the finger or stylus from within to the outside of the operation space with one possible input character being selected, the one possible input character is determined as a character input by the handwriting operation without performance of a troublesome operation such as depression of a button.

Suitably, the display control part may be configured to, in response to determining the continuance of the handwriting operation by the determining part, display the path of the contact position corresponding to the stroke information in a handwriting operation display area of the display part, and display the multiple possible input characters recognized by the character recognition part in multiple possible input display areas around the handwriting operation display area.

According to the above-described configuration, the path of the contact position of the finger or stylus and multiple possible input characters obtained as a result of character recognition are displayed in an easily viewable manner in the display part.

Suitably, the handwriting input device according to the first aspect may further include a stroke information generating part configured to generate stroke information corresponding to the path of the contact position detected by the sensor part during the handwriting operation whose start is determined by the determining part, a display part, and a display control part configured to display the path of the contact position corresponding to the stroke information in the display part in response to determining the continuance of the handwriting operation by the determining part, and to erase the path of the contact position displayed in the display part in response to determining the end of the handwriting operation by the determining part.

According to the above-described configuration, the path of the contact position corresponding to the stroke information generated during the continuing handwriting operation is displayed in the display part. This facilitates inputting a character or the like by handwriting operation. When the end of the handwriting operation is determined, the path of the contact position displayed in the display part is erased. Therefore, it is possible to easily become aware of the end of the handwriting operation.

Suitably, the sensor part may include multiple sensor elements provided at multiple locations at the input surface, the multiple sensor elements each being configured to detect a change in capacitance commensurate with the distance to the object.

According to the above-described configuration, the contact position on the input surface and the presence or absence of the finger or stylus within the operation space are detected based on a change in capacitance at the multiple sensor elements. Therefore, compared with the case of using independent sensors for these detections, it is possible to achieve a simplified configuration.

According to an aspect of the present invention, it is possible to accurately determine the continuance of a handwriting operation without performing a troublesome operation such as depression of a button.

What is claimed is:

1. A handwriting input device which, in response to a handwriting operation that moves an object on or over an input surface, inputs information corresponding to a path of a contact position at which the object is determined to be in contact with the input surface, the handwriting input device comprising:
a sensor part configured to detect the contact position of the object on the input surface and a presence or absence of the object within a predetermined operation space adjacent to the input surface; and
a processing circuit configured to
determine a start and an end of the handwriting operation based on a detection result of the sensor part,
generate stroke information corresponding to the path of the contact position detected by the sensor part during the handwriting operation whose start is determined,
recognize a character expressed by the path of the contact position, based on the stroke information generated during the handwriting operation, in response to determining the end of the handwriting operation,
determine a character input, based on a result of recognizing the character expressed by the path of the contact position based on the stroke information generated during the handwriting operation,
determine a continuance of the handwriting operation and retain the generated stroke information in response to detecting the presence of the object within the operation space by the sensor part after determining the start of the handwriting operation, even when the object is determined to be out of contact with the input surface during the handwriting operation,
determine the start of the handwriting operation in response to determining a contact of the object with the input surface, and
determine the end of the handwriting operation in response to determining that the object has moved out of the operation space from within the operation space based on detection of the absence of the object within the operation space by the sensor part after determining the start of the handwriting operation,
wherein a predetermined area for the handwriting operation is set on the input surface,
the operation space is a space within a predetermined distance from the predetermined area, and
the processing circuit is configured to determine the end of the handwriting operation in response to determining that a proximate position of the object is laterally outside the predetermined area from within the operation space, even when a distance between the input surface and the object is less than or equal to the predetermined distance.

2. The handwriting input device as claimed in claim 1, wherein
the sensor part is further configured to output a detection signal corresponding to the distance between the object and the input surface, and
the processing circuit is further configured to determine the end of the handwriting operation in response to the distance indicated by the detection signal output by the sensor part exceeding the predetermined distance after determining the start of the handwriting operation.

3. The handwriting input device as claimed in claim 1, wherein
the sensor part is further configured to detect the proximate position of the object on the input surface with the object being separated from the input surface, and
the processing circuit is further configured to determine the end of the handwriting operation in response to detecting the proximate position being outside the predetermined area on the input surface by the sensor part after determining the start of the handwriting operation.

4. The handwriting input device as claimed in claim 1, further comprising:
a display part,
wherein the processing circuit is further configured to display, in the display part, a plurality of possible input characters recognized by the processing circuit based on the stroke information generated during the handwriting operation, in response to determining the continuance of the handwriting operation,
wherein the sensor part is further configured to detect the proximate position of the object on the input surface with the object being separated from the input surface, and
wherein the processing circuit is further configured to determine the character input by the handwriting operation from among the plurality of possible input characters displayed in the display part, based on a direction in which the proximate position travels when the object moves outside the operation space.

5. The handwriting input device as claimed in claim 4, wherein the processing circuit is further configured to, in response to determining the continuance of the handwriting operation, display the path of the contact position corresponding to the stroke information in a handwriting operation display area of the display part, and display the plurality of possible input characters recognized by the processing circuit in a plurality of possible input display areas around the handwriting operation display area.

6. The handwriting input device as claimed in claim 1, further comprising:
a display part,
wherein the processing circuit is further configured to display, in the display part, a plurality of possible input characters recognized by the processing circuit based on the stroke information generated during the handwriting operation, in response to determining the continuance of the handwriting operation,
wherein the sensor part is further configured to detect the proximate position of the object on the input surface with the object being separated from the input surface,
wherein the processing circuit is further configured to, in response to detecting the presence of the object within the operation space by the sensor part, select one possible input character from among the plurality of possible input characters displayed in the display part, based on a pattern of a travel of the proximate position,
wherein the processing circuit is further configured to, in response to selecting the one possible input character, perform highlighting in the display part to indicate that the one possible input character is being selected, and
wherein the processing circuit is further configured to, in response to determining the end of the handwriting operation with the one possible input character being selected, determine the one possible input character as the character input by the handwriting operation.

7. The handwriting input device as claimed in claim 1, wherein the processing circuit is further configured to determine the end of the handwriting operation in response to detecting the absence of the object within the operation space continuously for a predetermined time or more by the sensor part after determining the start of the handwriting operation.

8. The handwriting input device as claimed in claim 1, further comprising:
a display part,
wherein the processing circuit is further configured to
generate stroke information corresponding to the path of the contact position detected by the sensor part during the handwriting operation whose start is determined,
display the path of the contact position corresponding to the stroke information in the display part in response to determining the continuance of the handwriting operation, and
erase the path of the contact position displayed in the display part in response to determining the end of the handwriting operation.

9. The handwriting input device as claimed in claim 1, wherein the sensor part includes a plurality of sensor elements provided at multiple locations at the input surface, the plurality of sensor elements each being configured to detect a change in capacitance commensurate with a distance to the object.

10. The handwriting input device as claimed in claim 1, wherein the processing circuit is further configured to
determine whether the object is in contact with the input surface by comparing a degree of proximity of the object to the input surface with a first threshold, based on the detection result of the sensor part, after determining the start of the handwriting operation, and
determine the presence or absence of the object within the operation space by comparing the degree of proximity with a second threshold in response to determining that the object is not in contact with the input surface.

11. The handwriting input device as claimed in claim 10, wherein the degree of proximity includes the distance between the object and the input surface.

12. The handwriting input device as claimed in claim 1, wherein
the input surface includes the predetermined area and an area surrounding the predetermined area, and
the processing circuit is configured to determine the end of the handwriting operation upon determining that coordinates of the object are laterally outside the predetermined area, even when the object is on or over the surrounding area of the input surface and the distance between the input surface and the object is less than or equal to the predetermined distance.

13. An information input method in a handwriting input device which, in response to a handwriting operation that moves an object on or over an input surface, inputs information corresponding to a path of a contact position at which the object is determined to be in contact with the input surface, the information input method comprising:
detecting, by a sensor, the contact position of the object on the input surface and a presence or absence of the object within a predetermined operation space adjacent to the input surface;
determining a start and an end of the handwriting operation based on a detection result of the sensor;

generating stroke information corresponding to the path of the contact position detected by the sensor during the handwriting operation whose start is determined;
recognizing a character expressed by the path of the contact position, based on the stroke information generated during the handwriting operation, in response to determining the end of the handwriting operation;
determining a character input, based on a result of recognizing the character expressed by the path of the contact position based on the stroke information generated during the handwriting operation;
determining a continuance of the handwriting operation and retain the generated stroke information in response to detecting the presence of the object within the operation space by the sensor after determining the start of the handwriting operation, even when the object is determined to be out of contact with the input surface during the handwriting operation;
determining the start of the handwriting operation in response to determining a contact of the object with the input surface; and
determining the end of the handwriting operation in response to determining that the object has moved out of the operation space from within the operation space based on detection of the absence of the object within the operation space by the sensor part after determining the start of the handwriting operation,
wherein a predetermined area for the handwriting operation is set on the input surface,
the operation space is a space within a predetermined distance from the predetermined area, and
the end of the handwriting operation is determined in response to determining that a proximate position of the object is laterally outside the predetermined area from within the operation space, even when a distance between the input surface and the object is less than or equal to the predetermined distance.

14. A non-transitory computer-readable recording medium storing a program that causes a computer to execute a process in a handwriting input device which, in response to a handwriting operation that moves an object on or over an input surface, inputs information corresponding to a path of a contact position at which the object is determined to be in contact with the input surface, the process comprising:
determining a start and an end of the handwriting operation based on a detection result of a sensor, the sensor detecting the contact position of the object on the input surface and a presence or absence of the object within a predetermined operation space adjacent to the input surface;
generating stroke information corresponding to the path of the contact position detected by the sensor during the handwriting operation whose start is determined;
recognizing a character expressed by the path of the contact position, based on the stroke information generated during the handwriting operation, in response to determining the end of the handwriting operation;
determining a character input based on a result of recognizing the character expressed by the path of the contact position based on the stroke information generated during the handwriting operation;
determining a continuance of the handwriting operation and retain the generated stroke information in response to detecting the presence of the object within the operation space by the sensor after determining the start of the handwriting operation, even when the object is determined to be out of contact with the input surface during the handwriting operation;

determining the start of the handwriting operation in response to determining a contact of the object with the input surface; and determining the end of the handwriting operation in response to determining that the object has moved out of the operation space from within the operation space based on detection of the absence of the object within the operation space by the sensor part after determining the start of the handwriting operation, wherein a predetermined area for the handwriting operation is set on the input surface, the operation space is a space within a predetermined distance from the predetermined area, and the end of the handwriting operation is determined in response to determining that a proximate position of the object is laterally outside the predetermined area from within the operation space, even when a distance between the input surface and the object is less than or equal to the predetermined distance.

* * * * *